US011403143B2

(12) United States Patent
Xiang et al.

(10) Patent No.: US 11,403,143 B2
(45) Date of Patent: Aug. 2, 2022

(54) DRR-BASED TWO STAGES IO SCHEDULING ALGORITHM FOR STORAGE SYSTEM WITH DYNAMIC BANDWIDTH REGULATION

(71) Applicant: VMware, Inc., Palo Alto, CA (US)

(72) Inventors: Enning Xiang, San Jose, CA (US); Eric Shannon Knauft, San Francisco, CA (US); Pascal Renauld, Palo Alto, CA (US); Yiqi Xu, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 74 days.

(21) Appl. No.: 17/112,618

(22) Filed: Dec. 4, 2020

(65) Prior Publication Data

US 2022/0179710 A1 Jun. 9, 2022

(51) Int. Cl.
*G06F 9/50* (2006.01)
*G06F 9/48* (2006.01)

(52) U.S. Cl.
CPC .......... *G06F 9/5038* (2013.01); *G06F 9/4856* (2013.01); *G06F 9/5044* (2013.01)

(58) Field of Classification Search
CPC ..... G06F 9/5038; G06F 9/4856; G06F 9/5044
See application file for complete search history.

(56) References Cited

U.S. PATENT DOCUMENTS

2019/0303308 A1* 10/2019 Knauft ................ G06F 3/0659
2019/0312925 A1* 10/2019 Xiang ................. H04L 67/322
2019/0317665 A1* 10/2019 Xu ........................ G06F 3/067

\* cited by examiner

*Primary Examiner* — Sisley N Kim
(74) *Attorney, Agent, or Firm* — Dentons US LLP

(57) ABSTRACT

An efficient scheduling of IOs in a computing system using dynamic bandwidth regulation includes building up a shared regulator to limit the total IOPS scheduling among all IO classes at any given time. Reserved regulators may be used to place limits on the IOPS scheduled for a particular IO class at any given time. An outstanding IO window may also limit the overall number of outstanding IOs, and/or the bytes of outstanding IOs at any particular time. A first stage of IO scheduling may involve enforcing the reserved regulators to limit the IOPS scheduled for particular IO classes. A second stage of IO scheduling may involve enforcing the shared regulator to limit the total IOPS scheduled for all IO classes.

20 Claims, 19 Drawing Sheets

T0 + delta: Post-1st Stage

Both classes have pending IO backlogs

VM IO 40% share reservation
[ 1 sec catchup window of VM reserved regulator ]

Resync IO 10% share reservation
[ 1 sec catchup window of resync reserved regulator ]

[ 1 sec catchup window of shared regulator ]

Catchup window slides forward as time passes

Outstanding IO Window: FULL
714

DRR-BASED TWO STAGES IO SCHEDULING ALGORITHM FOR STORAGE SYSTEM WITH DYNAMIC BANDWIDTH REGULATION

FIELD

The present disclosure relates generally to distributed-computing systems, and more specifically, to methods and systems that enable the efficient scheduling of inputs/outputs (IOs) for a computing system using dynamic bandwidth regulation.

BACKGROUND

Modern computing systems provide distributed data center services. Such services may be provided by a software designed data center (SDDC) that may implement one or more virtual storage area networks (e.g., a vSAN) and a virtual disk file system (e.g., a vDFS). Designers of these distributed systems struggle to meet the ever-increasing needs of their users, such as high storage efficiency for vast quantities of data, high demands for system bandwidth, recoverability for lost data, and low-latency in the event of system failures. Attempts at optimizing conventional systems for enhanced performance in any one of these system requirements may compromise the performance in one or more of the other system requirements. Thus, there is a need for enhanced efficiencies for such distributed systems.

OVERVIEW

Described herein are techniques for the efficient scheduling of inputs/outputs (IOs) for a computing system using dynamic bandwidth regulation. In one embodiment, a method for scheduling IOs in a distributed-computing system is performed. The method may include determining whether a first input/output class is active and has available tasks, wherein the first input/output class corresponds to a type of inputs/outputs received within the distributed computing system. The method may include, after determining that the first input/output class is active and has available tasks, updating a first deficit value of the first input/output class based on a deficit quantum value. The method may include, after updating the first deficit value based on the deficit quantum value, determining whether the first deficit value of the first input/output class meets a threshold to dispatch a first task in a first queue of inputs/outputs corresponding to the first input/output class. The method may include determining whether an outstanding limit on inputs/outputs has been reached. The method may include determining whether an amount of bandwidth remaining in a reserved regulator corresponding to the first class meets a threshold amount of bandwidth required to dispatch the first task. The method may further include, in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

In one embodiment, a non-transitory computer-readable storage medium storing one or more programs configured to be executed by one or more processors is provided. The one or more programs stored by the non-transitory computer-readable storage medium include instructions for performing operations that are executable by a distributed computing system. The operations may include determining whether a first input/output class is active and has available tasks, wherein the first input/output class corresponds to a type of inputs/outputs received within the distributed computing system. The operations may include, after determining that the first input/output class is active and has available tasks, updating a first deficit value of the first input/output class based on a deficit quantum value. The operations may include, after updating the first deficit value based on the deficit quantum value, determining whether the first deficit value of the first input/output class meets a threshold to dispatch a first task in a first queue of inputs/outputs corresponding to the first input/output class. The operations may include determining whether an outstanding limit on inputs/outputs has been reached. The operations may include determining whether an amount of bandwidth remaining in a reserved regulator corresponding to the first class meets a threshold amount of bandwidth required to dispatch the first task. The operations may further include, in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

In one embodiment, a distributed computing system for storing data may include one or more processors and memory. The memory may store one or more programs configured to be executed by the one or more processors. The one or more programs may include instructions for performing operations comprising determining whether a first input/output class is active and has available tasks, wherein the first input/output class corresponds to a type of inputs/outputs received within the distributed computing system. The operations may comprise, after determining that the first input/output class is active and has available tasks, updating a first deficit value of the first input/output class based on a deficit quantum value. The operations may comprise, after updating the first deficit value based on the deficit quantum value, determining whether the first deficit value of the first input/output class meets a threshold to dispatch a first task in a first queue of inputs/outputs corresponding to the first input/output class. The operations may comprise determining whether an outstanding limit on inputs/outputs has been reached. The operations may comprise determining whether an amount of bandwidth remaining in a reserved regulator corresponding to the first class meets a threshold amount of bandwidth required to dispatch the first task. The operations may comprise, in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

DETAILED DESCRIPTION

Figure 1B:
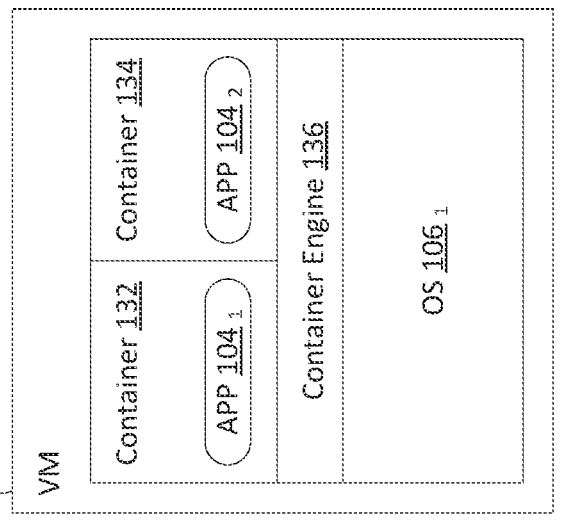
FIG. 1B is a block diagram illustrating a containerized application framework for implementing various components of a distributed-computing system, in accordance with some embodiments.

In the following description of embodiments, reference is made to the accompanying drawings which show, by way of illustration, specific embodiments that can be practiced. It is to be understood that other embodiments can be used and structural changes can be made without departing from the scope of the various embodiments.

Distributed computing systems, such as software designed data centers (SDDCs), may implement one or more virtual storage area networks (vSANs) and one or more virtual disk file systems (vDFS) that manages data stored on one or more virtualized storage disks. A vSAN may contain multiple storage nodes between which various classes of inputs and outputs (IOs) are routinely communicated. The IOs may correspond to tasks being performed at various virtual machines (VMs) within the vSAN, resync operations, or other classes or categorizations. The vSAN may have limited resources for dispatching or carrying out these IOs, and may benefit from techniques for reducing latency or congestion via IO scheduling techniques. In particular, IOs may be synced across a local area network (LAN) or a wide area network (WAN) with limited capacity, so different signals being communicated within the vSAN may need to compete for resources. Efficiently allocating resources to prevent delays or latency may thus be beneficial.

One way of handling IO scheduling is the deficit round robin (DRR) IO scheduling algorithm. The deficit round robin (DRR) IO scheduling algorithm is generally effective and cost-efficient in providing share-proportional fair ordering for different classes of IO, especially when the IO workloads are conservative. However, an IO class with low object input/output (OIO) but a high share, also known as a low workload, may be punished by the DRR IO scheduling algorithm when contending with other classes because the waiting list of such an IO class would be empty at most times, and the deficit (credit assigned to the IO class and consumed for each dispatched IO) would be reset. At the same time, a high OIO but low share class could have high IO throughput, and because it always maintains a waiting list, its deficit could always be supplemented to a non-zero value when the deficit quantum is added in each round of scheduling. Thus, newly incoming IOs of the low workload IO class could be blocked by the high workload IO class until the deficit of the high workload class is used up, or the high workload IO class runs out of pending IOs. This would unnecessarily induce scheduling latency for the low workload class, and make its throughput deviate from its expected share of the bandwidth.

In order to manage IO bursts that could trigger performance regression at an underlying disk media layer in a vSAN, and to manage the problem between low workload IO classes and high workload IO classes described above, embodiments of the IO scheduling technique described below build up two kinds of IOPS (input/output operations per second) regulators. Some embodiments of the IO scheduling technique, which will be described in more detail below, have one shared IOPS regulator (shared regulator), which reflects the best estimated bandwidth of the underlying media layer in real time (dynamically). In some embodiments, each IO class also has a reserved IOPS regulator (reserved regulator) with a value proportional to the expected share of the IO class and the value of the shared IOPS regulator. Thus, the sum of the limits of all of the reserved regulators is, at most, the same as the limit of the shared regulator.

In some embodiments, the IO scheduling technique is divided into two stages. In the first stage, the reserved IOPS regulator of each class is enforced in a round robin way. Each IO class will be processed, and in each batch, an IO class with pending IOs will have a fixed amount of credit (corresponding to a percentage of outstanding IO bytes according to the share of the IO class) added to its reserved deficit, similar to the deficit round robin (DRR) algorithm. Then, pending IOs of the IO class will be dispatched until the IO class runs out of pending IOs, runs out of reserved deficit, its outstanding IO window becomes full, or its reserved IOPS regulator runs out of time slices. Then, that IO class will be marked as inactive, and will not be involved in additional batches of task scheduling in this round. As the first stage of the IO scheduling technique is running, values of the dispatched IOs are recorded in both the class's reserved regulator and the shared regulator. But, in the first stage, the catchup window for the shared regulator is not enforced. Thus, the catchup window of the shared regulator can be overflowed in the first stage. The first stage finishes when all IO classes are marked as inactive.

In some embodiments, in the second stage of the IO scheduling technique, a deficit round robin (DRR) scheduling algorithm is run along with enforcing the shared IOPS regulator and the window of outstanding IO window. If the catchup time window of the shared IOPS regulator still has available time slices and the window of outstanding dispatched IO still has available slots, more pending IOs will be dispatched in the second stage in a round robin way. At each batch, a fixed amount of credit (corresponding to a percentage of outstanding IO bytes according to the share of the IO class) will be added to the reserved deficit of each IO class with pending IOs. The pending IOs will continue to be dispatched until the IO class runs out of pending IOs, runs out of shared deficit, or until the outstanding IO window is full. If the outstanding IO window becomes full, the round of IO scheduling will stop, and IO scheduling will be restarted at the first stage when outstanding IOs are completed. If the catchup window of the shared IOPS regulator runs out of time slices, the second stage (this round of IO scheduling) will pause, and a timer will be set to wait for a set period of time for the IOPS regulators (reserved and/or shared) to have available time slices to dispatch the next pending IO.

The IO scheduling technique, which summarized above and described in more detail below, guarantees that the reserved IOPS catchup window is not blocked by other IO classes and that incoming IOs will be able to be dispatched without scheduling delays. Meanwhile, the traffic overflow is bounded to 2× the catchup window of the IOPS regulator. This is because the sum of the limits of all of the class-specific reserved regulators adds up to, at most, the size of the shared regulator. This IO scheduling technique improves tolerance to traffic overflow when there is no congestion, as higher congestion will dynamically result in a smaller IOPS regulator. Thus, there will be less traffic overflow.

Figure 1A:
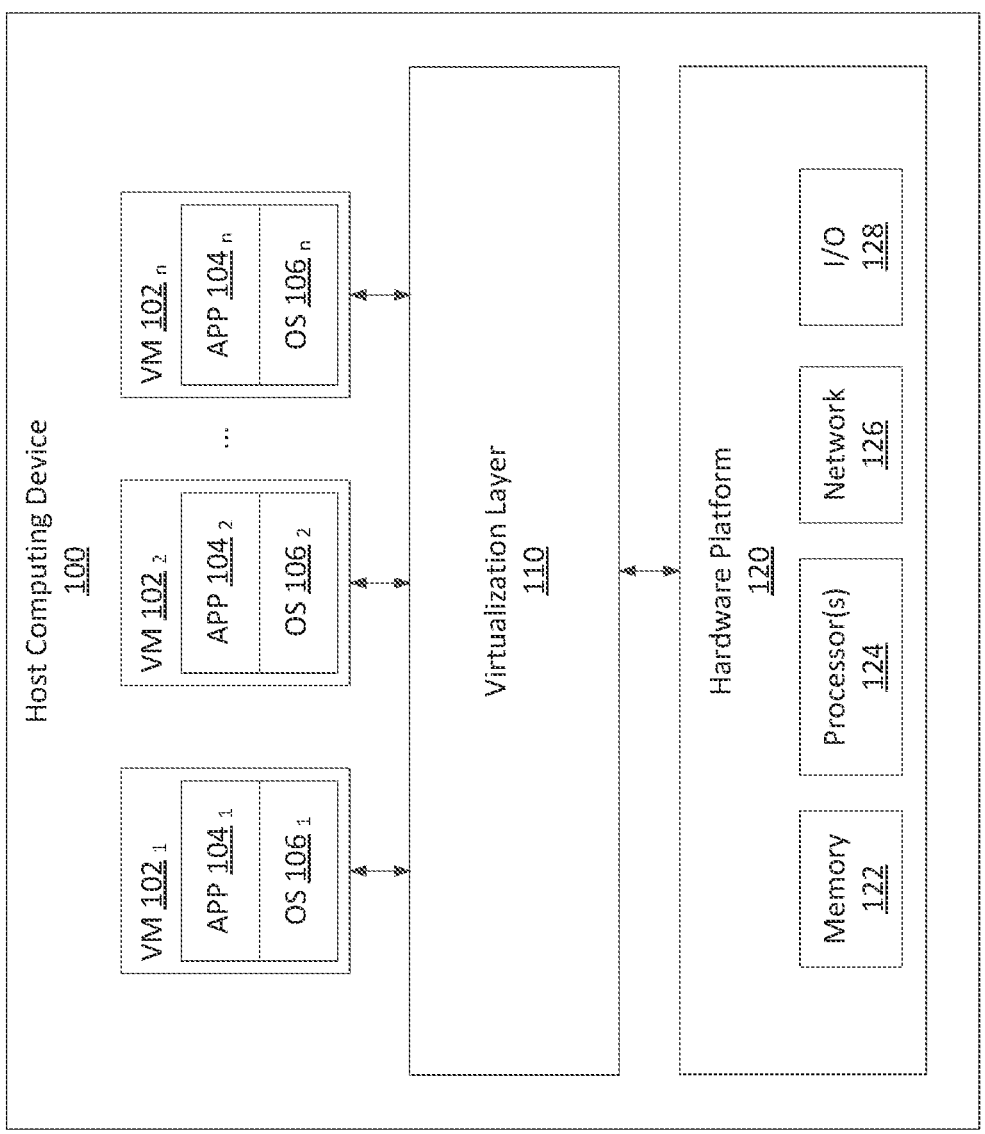
FIG. 1A is a block diagram illustrating a system and environment for implementing various components of a distributed-computing system, in accordance with some embodiments.

FIG. 1A is a block diagram illustrating a system and environment for implementing various components of a distributed-computing system, according to some embodiments. As shown in FIG. 1, virtual machines (VMs) $102_1$, $102_2 \ldots 120_n$ are instantiated on host computing device 100. In some embodiments, host computing device 100 implements one or more elements of a distributed-computing system (e.g., storage nodes of a vSAN 200 described with reference to FIG. 2). Hardware platform 120 includes memory 122, one or more processors 124, network interface 126, and various I/O devices 128. Memory 122 includes computer-readable storage medium. The computer-readable storage medium is, for example, tangible and non-transitory. For example, memory 122 includes high-speed random access memory and also includes non-volatile memory, such as one or more magnetic disk storage devices, flash memory devices, NVMe devices, Persistent Memory, or other non-volatile solid-state memory devices. In some embodiments, the computer-readable storage medium of memory 122 stores instructions for performing the methods and processes described herein. In some embodiments, hardware platform 120 also includes other components, including power supplies, internal communications links and busses, peripheral devices, controllers, and many other components.

Virtualization layer 110 is installed on top of hardware platform 120. Virtualization layer 110, also referred to as a hypervisor, is a software layer that provides an execution environment within which multiple VMs 102 are concurrently instantiated and executed. The execution environment of each VM 102 includes virtualized components analogous to those comprising hardware platform 120 (e.g. a virtualized processor(s), virtualized memory, etc.). In this manner, virtualization layer 110 abstracts VMs 102 from physical hardware while enabling VMs 102 to share the physical resources of hardware platform 120. As a result of this abstraction, each VM 102 operates as though it has its own dedicated computing resources.

Each VM 102 includes operating system (OS) 106, also referred to as a guest operating system, and one or more applications (Apps) 104 running on or within OS 106. OS 106 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. As in a traditional computing environment, OS 106 provides the interface between Apps 104 (i.e. programs containing software code) and the hardware resources used to execute or run applications. However, in this case the "hardware" is virtualized or emulated by virtualization layer 110. Consequently, Apps 104 generally operate as though they are in a traditional computing environment. That is, from the perspective of Apps 104, OS 106 appears to have access to dedicated hardware analogous to components of hardware platform 120.

FIG. 1B is a block diagram illustrating a containerized application framework for implementing various components of a distributed-computing system, in accordance with some embodiments. More specifically, FIG. 1B illustrates VM $102_1$ implementing a containerized application framework. Containerization provides an additional level of abstraction for applications by packaging a runtime environment with each individual application. Container 132 includes App $104_1$ (i.e., application code), as well as all the dependencies, libraries, binaries, and configuration files needed to run App $104_1$. Container engine 136, similar to virtualization layer 110 discussed above, abstracts App $104_1$ from OS $106_1$, while enabling other applications (e.g., App $104_2$) to share operating system resources (e.g., the operating system kernel). As a result of this abstraction, each App 104 runs the same regardless of the environment (e.g., as though it has its own dedicated operating system). In some embodiments, a container (e.g., container 132 or 134) can include a gateway application or process, as well as all the dependencies, libraries, binaries, and configuration files needed to run the gateway applications.

It should be appreciated that applications (Apps) implementing aspects of the present disclosure are, in some embodiments, implemented as applications running within traditional computing environments (e.g., applications run on an operating system with dedicated physical hardware), virtualized computing environments (e.g., applications run on a guest operating system on virtualized hardware), containerized environments (e.g., applications packaged with dependencies and run within their own runtime environment), distributed-computing environments (e.g., applications run on or across multiple physical hosts) or any combination thereof. Furthermore, while specific implementations of virtualization and containerization are discussed, it should be recognized that other implementations of virtualization and containers can be used without departing from the scope of the various described embodiments.

Figure 2:
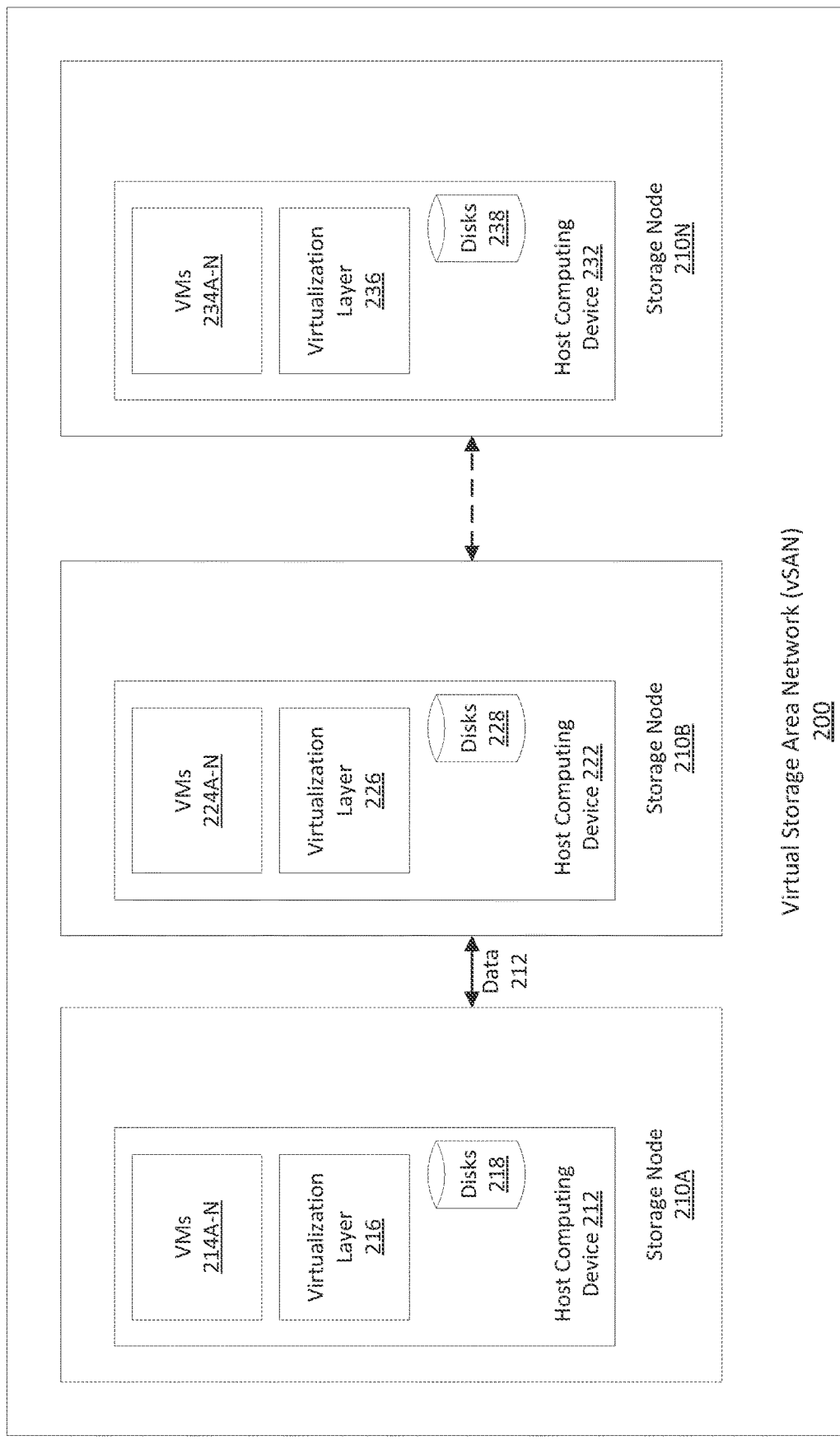
FIG. 2 is a block diagram illustrating a virtual storage area network (vSAN), in accordance with some embodiments.

FIG. 2 is a block diagram illustrating a virtual storage area network (vSAN) 200, in accordance with some embodiments. As described above, a vSAN is a logical partitioning of a physical storage area network. A vSAN divides and allocates a portion of or an entire physical storage area network into one or more logical storage area networks, thereby enabling the user to build a virtual storage pool. As illustrated in FIG. 2, vSAN 200 can include a cluster of storage nodes 210A-N, which can be an exemplary virtual storage pool. In some embodiments, each node of the cluster of storage nodes 210A-N can include a host computing device. FIG. 2 illustrates that storage node 210A includes a host computing device 212; storage node 210B includes a host computing device 222; and so forth. In some embodiments, the host computing devices (e.g., devices 212, 222, 232) can be implemented using host computing device 100 described above. For example, as shown in FIG. 2, similar to those described above, host computing device 212 operating in storage node 210A can include a virtualization layer 216 and one or more virtual machines 214A-N (collectively as VMs 214). In addition, host computing device 212 can also include one or more disks 218 (e.g., physical disks) or disk groups. In some embodiments, VM 214 can have access to one or more physical disks 218 or disk groups via virtualization layer 216 (e.g., a hypervisor). In the description of this application, a storage node is sometimes also referred to as a host computing device.

As illustrated in FIG. 2, data can be communicated among storage nodes 210A-N in vSAN 200. One or more storage nodes 210A-N can also be logically grouped or partitioned to form one or more virtual storage pools such as clusters of storage nodes. The grouping or partitioning of the storage nodes can be based on pre-configured data storage policies such as fault tolerance policies. For example, a fault tolerance policy (e.g., a redundant array of independent disks policy or a RAID policy) may require that multiple duplicates of a same data component be stored in different storage nodes (e.g., nodes 210A and 210B) such that data would not be lost because of a failure of one storage node containing one duplicate of the data component. Such a policy thus provides fault tolerance using data redundancy. In the above example, each duplicate of the entire data component can be stored in one storage node (e.g., node 210A or node 210B). As described in more detail below, in some embodiments, multiple subcomponents of a data component or duplicates thereof can be stored in multiple storage nodes using dynamic partitioning techniques, while still in compliance with the fault tolerance policy to provide data redundancy and fault tolerance. For example, a particular data component may have a size that is greater than the storage capacity of a single storage node (e.g., 256 Gb). Using the dynamic partitioning techniques, the data component can be divided to multiple smaller subcomponents and stored in multiple storage nodes. A data structure (e.g., a hash map) for the subcomponents is determined and maintained for efficient data resynchronization. It should be appreciated that multiple data components can be stored in a storage node. And data structures for the subcomponents of the multiple data components can also be determined and maintained for efficient data resynchronization.

Figure 3:
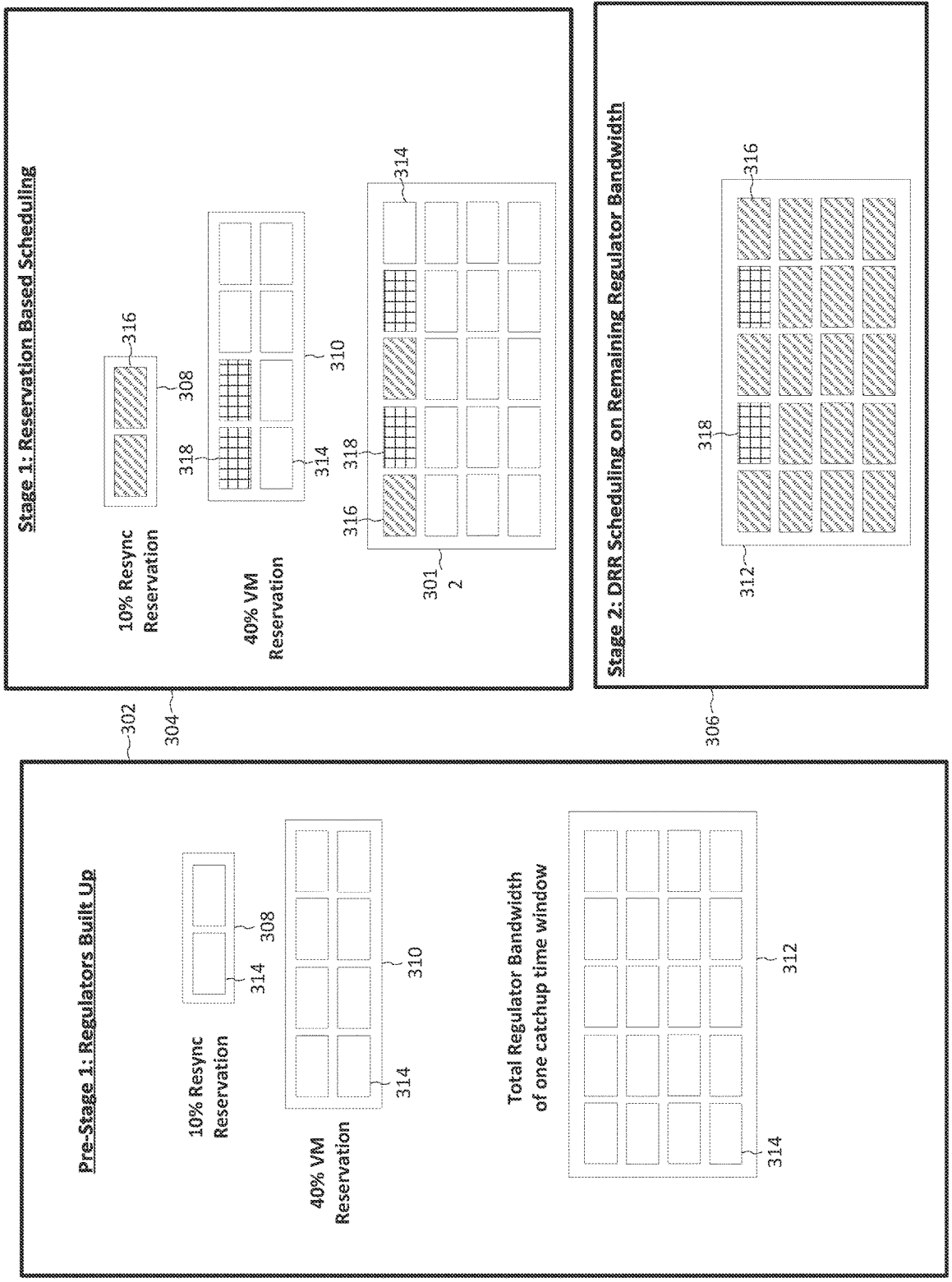
FIG. 3 illustrates an exemplary overview of the IO scheduling technique.

FIG. 3 illustrates an exemplary implementation of an IO scheduler executing in a vSAN. More specifically, FIG. 3 provides an example of a snapshot of how the IO scheduling technique would progress in a particular situation. FIG. 3 illustrates the IO scheduling technique at three different points in time. Pre-stage 1 snapshot 302 illustrates the point in time at which the scheduler has built up regulators in a vSAN, including resync reserved regulator 308, VM reserved regulator 310, and shared regulator 312. Notably, in pre-stage 1 snapshot 302, resync reserved regulator 308, VM reserved regulator 310, and shared regulator 312 all contain only unused slots 314. Stage 1 snapshot 304 illustrates the point in time after the first stage of the scheduling technique has executed. As discussed above, the class-specific reserved regulators are enforced during the first stage of scheduling, but the shared regulator is not. In post-stage 1 snapshot 304, some of the unused slots 314 have been used up by tasks that were scheduled in the first stage of the IO scheduling technique. For example, resync reserved regulator 308 is now full with two resync IOs 316, VM reserved regulator 310 now contains two VM IOs 318, and shared regulator contains all of the resync IOs 316 and VM IOs 318 in resync reserved regulator 308 and VM reserved regulator 310, respectively. Finally, in post-stage 2 snapshot 306, the shared regulator is filled with additional resync IOs 316 until its capacity has been filled. As discussed above, the second stage enforces the shared regulator but not the reserved regulator. Thus, additional resync IOs 316 were able to be scheduled in the second stage (but not the first stage) because the reserved regulator for the resync IO class was full, but the shared regulator was not. As shown, even after the reserved resync reserved regulator had been filled to capacity with resync IOs in the post-stage 1 snapshot 304, a backlog of pending resync IOs remained. However, because the IO scheduling technique enforced a limit on the number of resync IOs 316 that could be scheduled during stage 1, the additional resync IOs 316 were not scheduled/dispatched until stage 2.

Figure 4A:
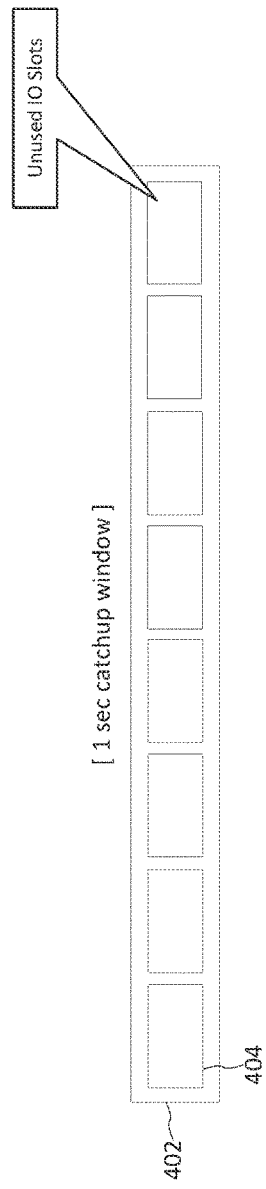
FIGS. 4A-4C illustrate an exemplary overview of the catchup window's progression over time.
Figure 4B:
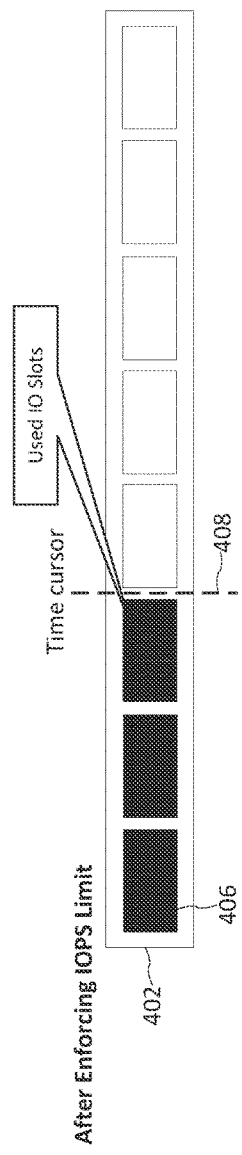
Figure 4C:
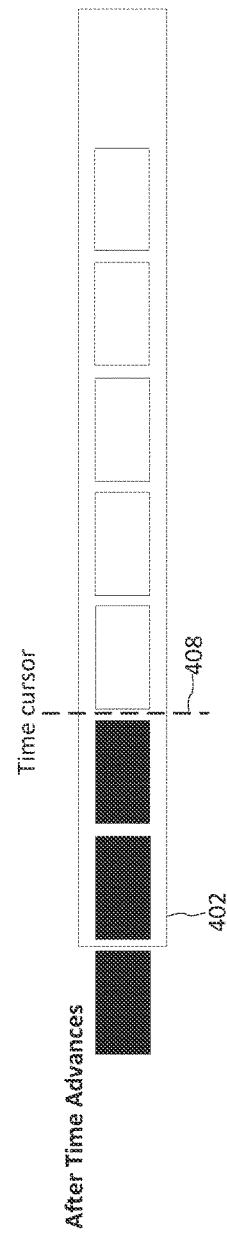

FIGS. 4A-4C illustrate the progression of catchup window 402 over time according to some embodiments. FIG. 4A shows catchup window 402 at a first time at which it is full of unused slots 404. FIG. 4B shows the catchup window 402 when a limit on the input/output operations per second has been enforced. At this point, the catchup window now has five unused slots 404 and three used IO slots 406. Next, FIG. 4C illustrates that the catchup window 402 slides forward in accordance with the padding of time. Thus, after time advances and the catchup window 402 progresses, the catchup window no longer contains one of the used IO slots 406 that it contained in FIG. 4B. As discussed above, the reserved regulators and shared regulator enforce IOPS (input/output operations per second) limits. So, as time progresses, the outstanding inputs/outputs in any given 1-second window will changes as time elapses and the catchup window 402 slides forward.

FIGS. 5A-5D are a series of sequential snapshots demonstrating how the IO scheduling technique would schedule IOs under a particular set of circumstances according to some embodiments. In particular, FIGS. 5A-5D illustrate the concept of tasks being scheduled as in the first and second stages of the IO scheduling technique discussed above as the catchup window slides forward, and accordingly, slots in the reserved regulator and shared regulator become available/unused.

Figure 5A:
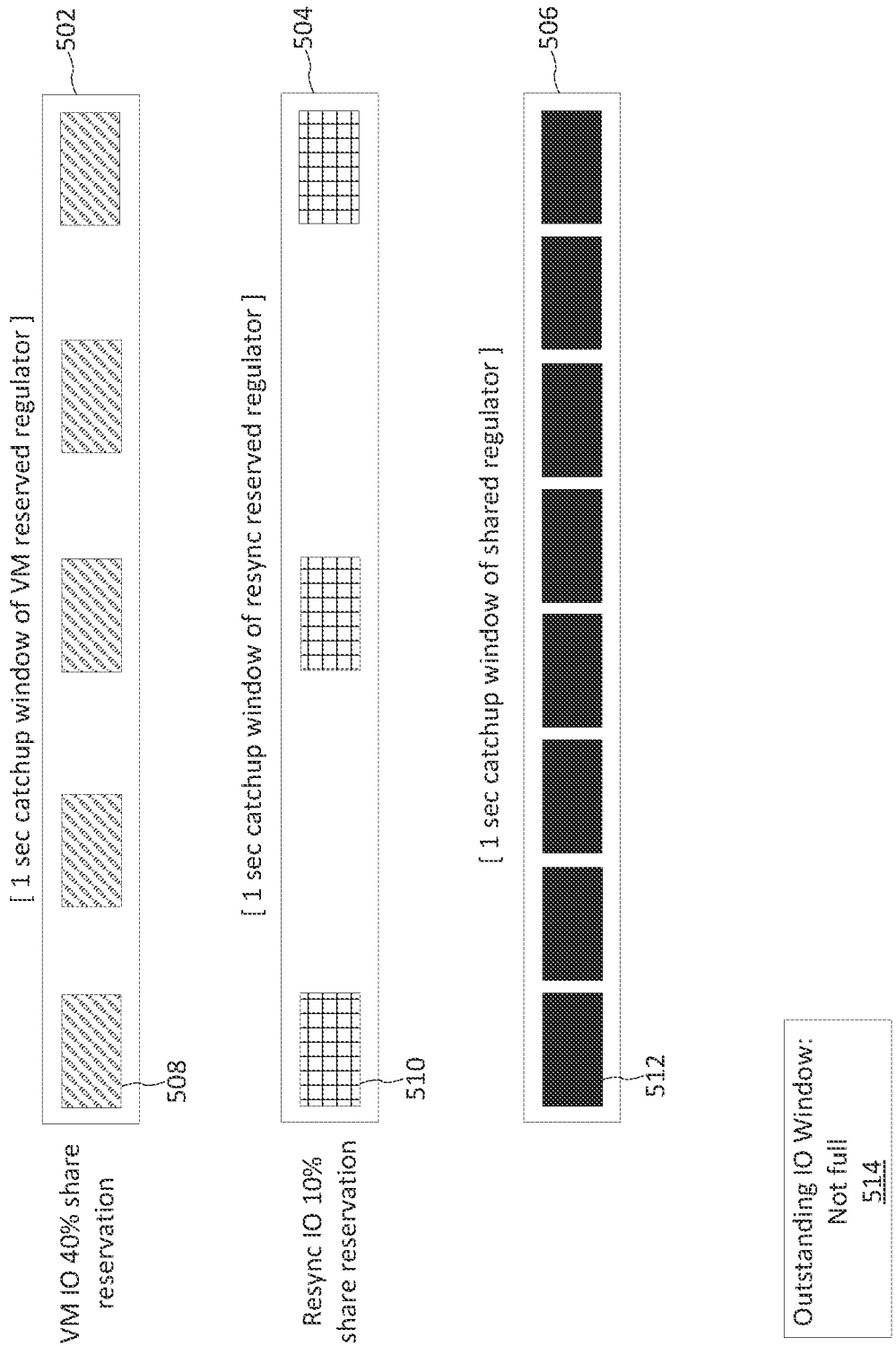
FIG. 5A illustrates an exemplary snapshot of class-specific regulators, a shared regulator, and an outstanding IO window at an initial time.

FIG. 5A is a snapshot of the relevant IO scheduling technique components at an initial time T0. FIG. 5A shows that, at time T0, the VM reserved regulator 502 is completely full of VM IOs 508, the resync reserved regulator 504 is completely full of resync IOs 510, the shared regulator 506 is full of used IO slots 512, and the outstanding IO window 514 is not yet full.

Figure 5B:
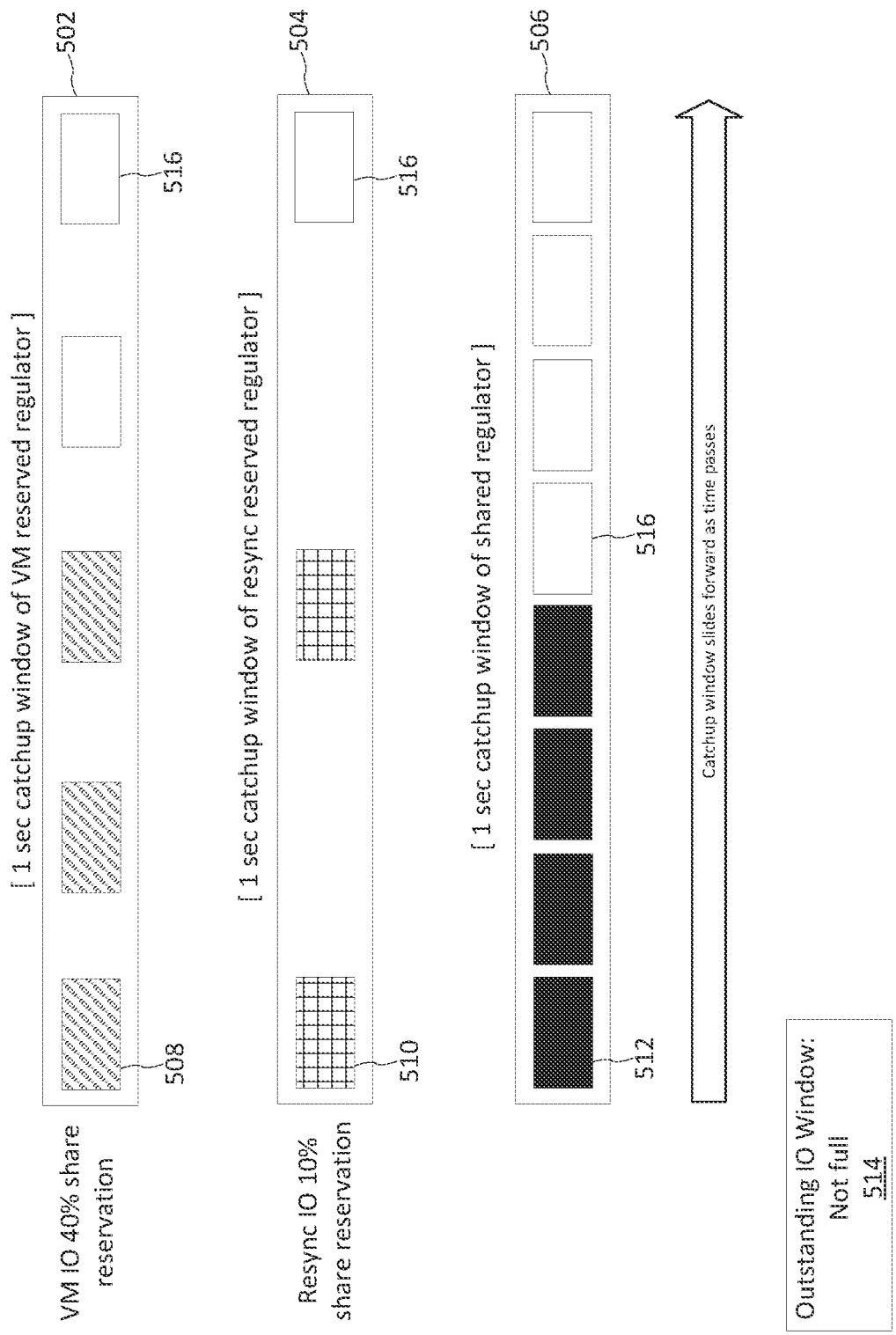
FIG. 5B illustrates an exemplary snapshot of class-specific regulators, a shared regulator, and an outstanding IO window at a time occurring after the initial time, but before a first stage of the IO scheduling technique has executed.

FIG. 5B illustrates a snapshot of the IO scheduling technique as begun in FIG. 5A but at a later time, T0+ delta. FIG. 5B shows the stage in the IO scheduling technique at which time has passed, so the catchup window has slid forward. At this time, there are now newly availably unused slots 516 in the VM reserved regulator 502, the resync reserved regulator 504, and the shared regulator 506. In particular, the VM reserved regulator 502 is shown with two unused slots 516, the resync reserved regulator 504 is shown with one unused slot 516, and the shared regulator 506 is shown with four unused slots 516. In addition, FIG. 5B illustrates that the IO window 514 is still not full. This is consistent with the fact that no additional IOs have been scheduled between FIG. 5A and FIG. 5B.

Figure 5C:
FIG. 5C illustrates an exemplary snapshot of class-specific regulators, a shared regulator, and an outstanding IO window at a time occurring after the initial time, after a first stage of the IO scheduling technique has executed, but before a second stage of the IO scheduling technique has executed.

FIG. 5C illustrates a snapshot of the IO scheduling technique as begun in FIG. 5A but at a later time, T0+ delta, and after a first stage of the IO scheduling technique has executed. At this point, additional IOs have been scheduled. Namely, two more VM IOs 508 have been added to the VM reserved regulator 502, as demonstrated by the two additional VM IOs 508 pictured in FIG. 5C that replaced unused slots 516 in VM reserved regulator 502 between FIGS. 5B and 5C. Likewise, these two VM IOs 508 are also added to the shared regulator 506, which is shown containing two VM IOs 508 which were not in the shared regulator 506 in FIG. 5B. Similarly, one additional resync IO has been added to the resync reserved regulator 504 and to the shared regulator 506. Notably, the first stage of the IO scheduling technique involves enforcing the reserved regulators of each class, or in this case, the VM reserved regulator 502 and the resync reserved regulator 504. However, in some embodiments, the first stage of the IO scheduling technique does not enforce the shared regulator 506. FIG. 5C shows that the first stage of the IO scheduling technique ends with one remaining unused slot 516 in the shared regulator. The first stage of the IO scheduling technique ends when all classes are inactive, or when the outstanding IO window 514 is full. As shown in FIG. 5C, the outstanding IO window 514 is not full, so all of the IO classes must have been marked as inactive. The two reserved regulators, VM reserved regulator 502 and resync reserved regulator 504, correspond to two classes of IOs. In particular, the VM reserved regulator corresponds to a VM IO class and the resync reserved regulator corresponds to a resync IO class. The capacity of the reserved regulators is set based on the expected bandwidth share of the IO classes to which they correspond. So, in this case, the VM IO class is expected to account for 40% of IOs, whereas the resync IO class is expected to account for 10% of IOs. The first stage of the IO scheduling technique may have ended because the IO classes were marked as inactive based on a determination that there was not sufficient regulator bandwidth in the respective reserved regulators of each class to dispatch subsequent IOs.

Figure 5D:
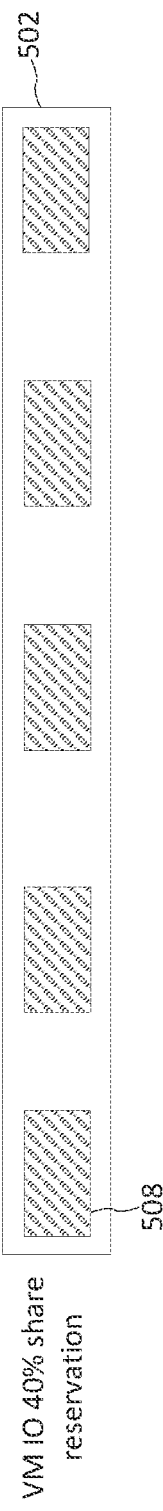
FIG. 5D illustrates an exemplary snapshot of class-specific regulators, a shared regulator, and an outstanding IO window at a time occurring after the initial time, after the first stage of the IO scheduling technique has executed, and after a second stage of the IO scheduling technique has executed.
Figure 5D:
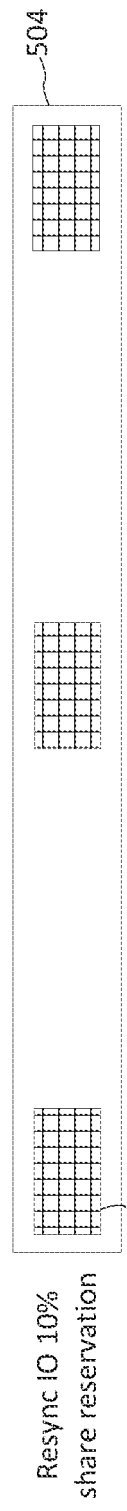
Figure 5D:
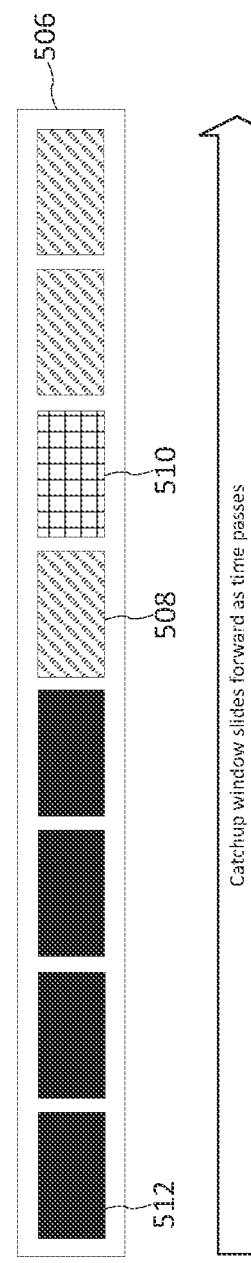

FIG. 5D illustrates a snapshot of the IO scheduling technique as begun in FIG. 5A but at a later time, T0+ delta, and after a second stage of the IO scheduling technique has executed. At this point, an additional VM IO 508 has been added to the shared regulator 506 despite the VM reserved regulator 502 being full. This indicates that the VM IO class (or both the VM IO class and the resync IO class) had pending backlogs. In some embodiments, in stage 2, the reserved regulators of individual IO classes are not enforced, but the shared regulator 506 is enforced. Thus, additional IOs will not be added to the shared regulator 506 in the second stage of the IO scheduling technique after it has already hit its capacity. Here, however, one additional VM IO 508 was added to the shared regulator 506 at least partially because it was not at capacity after the first stage of the IO scheduling technique had executed, as was shown in FIG. 5C. The second stage of the IO scheduling technique schedules IOs based on a modified deficit round robin algorithm while enforcing both the shared regulator 506 as well as the outstanding IO window 514. Here, the IO scheduling window is shown as not full.

FIGS. 6A-6D are a series of sequential snapshots illustrating how the IO scheduling technique, in some embodiments, allows the shared regulator to be overflowed in the first stage of the IO scheduling technique. Allowing for overflows helps manage IO bursts. In this IO scheduling technique, because the total sum of the capacities of the reserved regulators of all of the IO classes is, at most, equal to the capacity of the shared regulator, the potential overflow is bounded to double the capacity of the shared regulator at most. This allows for smooth averages in bandwidth handling in the vSAN and for improved handling of congestion in response to a spike in IOs.

Figure 6A:
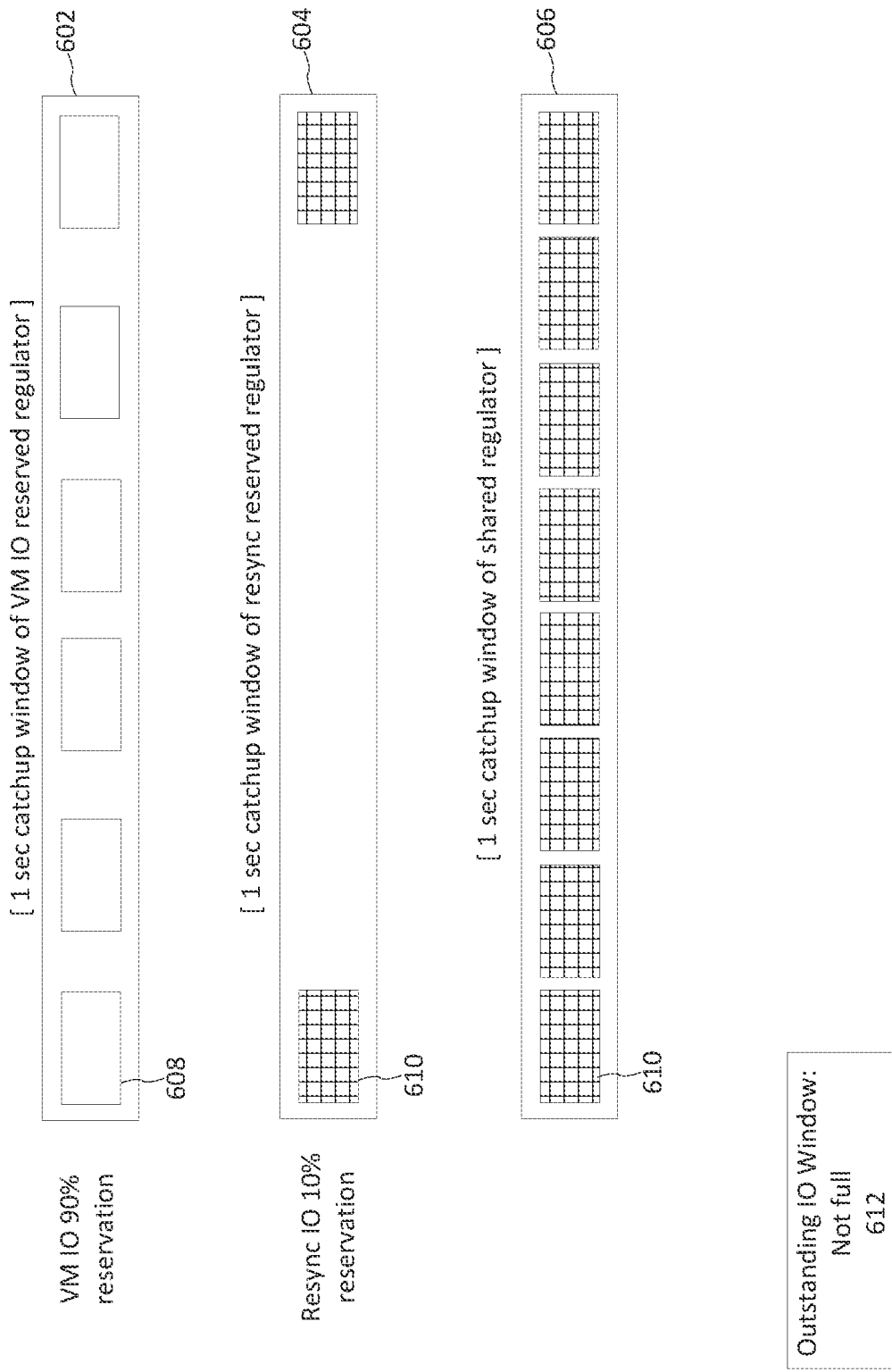
FIG. 6A illustrates an exemplary snapshot of class-specific regulators, a shared regulator, and an outstanding IO window at an initial time.

FIG. 6A is a snapshot of the relevant IO scheduling technique components at an initial time T0. FIG. 6A shows that, at time T0, the VM reserved regulator 602 is completely empty, as it only contained unused slots 608. Meanwhile, the resync reserved regulator 604 is completely full of resync IOs 610, and the shared regulator 606 is also full of resync IOs 610. The outstanding IO window 612 is not yet full.

Figure 6B:
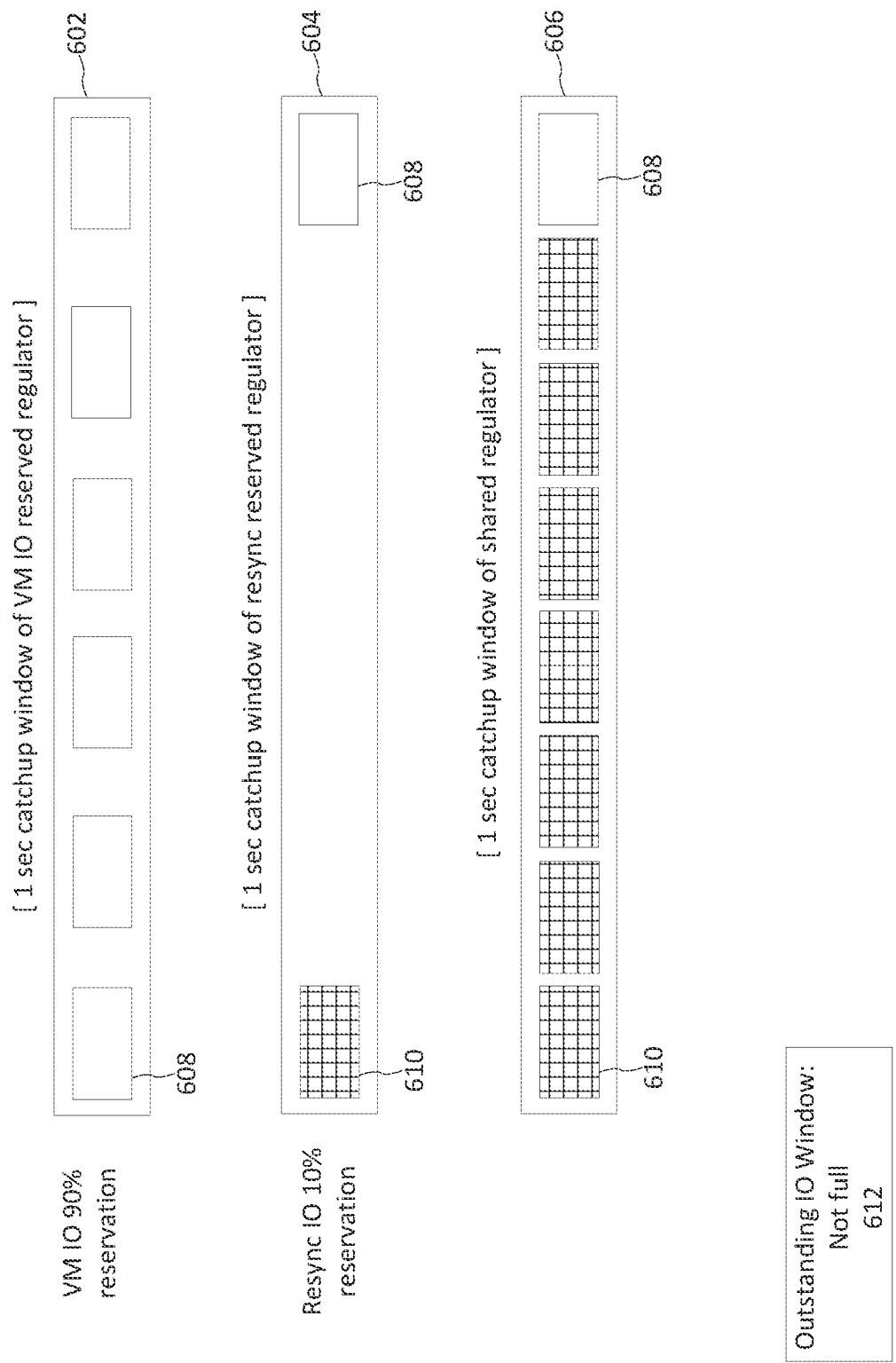
FIG. 6B illustrates an exemplary snapshot of class-specific regulators, a shared regulator, and an outstanding IO window at a time occurring after the initial time, but before a first stage of the IO scheduling technique has executed.

FIG. 6B illustrates a snapshot of the IO scheduling technique as begun in FIG. 6A but at a later time, T0+ delta. FIG. 6B illustrates the stage in the IO scheduling technique at which time has passed, so the catchup window has slid forward. At this time, there are now newly availably unused slots 608 in the VM reserved regulator 602, the resync reserved regulator 604, and the shared regulator 606. In particular, the VM reserved regulator 602 is shown with five unused slots 608, the resync reserved regulator 604 is shown with one unused slot 608, and the shared regulator 606 is shown with one unused slot 608. In addition, FIG. 6B illustrates that the IO window 612 is still now full. This is consistent with the fact that no additional IOs have been scheduled between FIG. 6A and FIG. 6B.

Figure 6C:
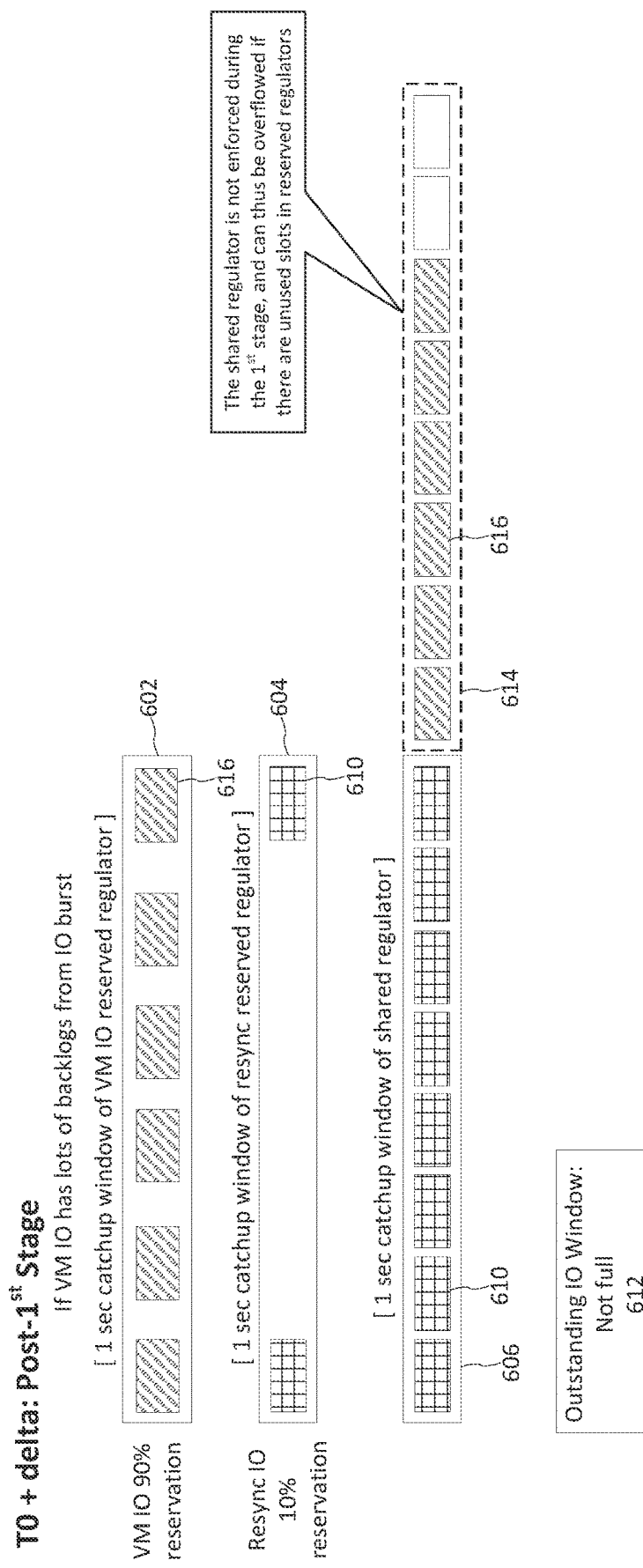
FIG. 6C illustrates an exemplary snapshot of class-specific regulators, a shared regulator, and an outstanding IO window at a time occurring after the initial time, after a first stage of the IO scheduling technique has executed, but before a second stage of the IO scheduling technique has executed.

FIG. 6C illustrates a snapshot of the IO scheduling technique as begun in FIG. 6A but at a later time, T0+ delta, and after a first stage of the IO scheduling technique has executed. Notably, a burst of VM IOs came in during the first stage of the IO scheduling technique. So, in addition to an additional resync IO 610 being added to the resync reserved regulator 604 and the shared regulator 606, the VM reserved regulator 602 is also filled to capacity with six newly added VM IOs 616. Notably, the additional VM IOs 616 are added to the VM reserved regulator 602 despite the shared regulator 606 being at capacity, as the shared regulator 606 is not enforced during the first stage of the IO scheduling technique. However, although the shared regulator 606 is not enforced during the first stage of the IO scheduling technique, additional IOs scheduled still need to be recorded in the shared regulator 606. In this case, adding the additional VM IOs 616 to the shared regulator 606 causes it to overflow into overflow region 616. Notably, as discussed above, because the reserved regulators are enforced in the first stage of IO scheduling, the most that the shared regulator can be overflowed by is the sum of the reserved regulators.

Figure 6D:
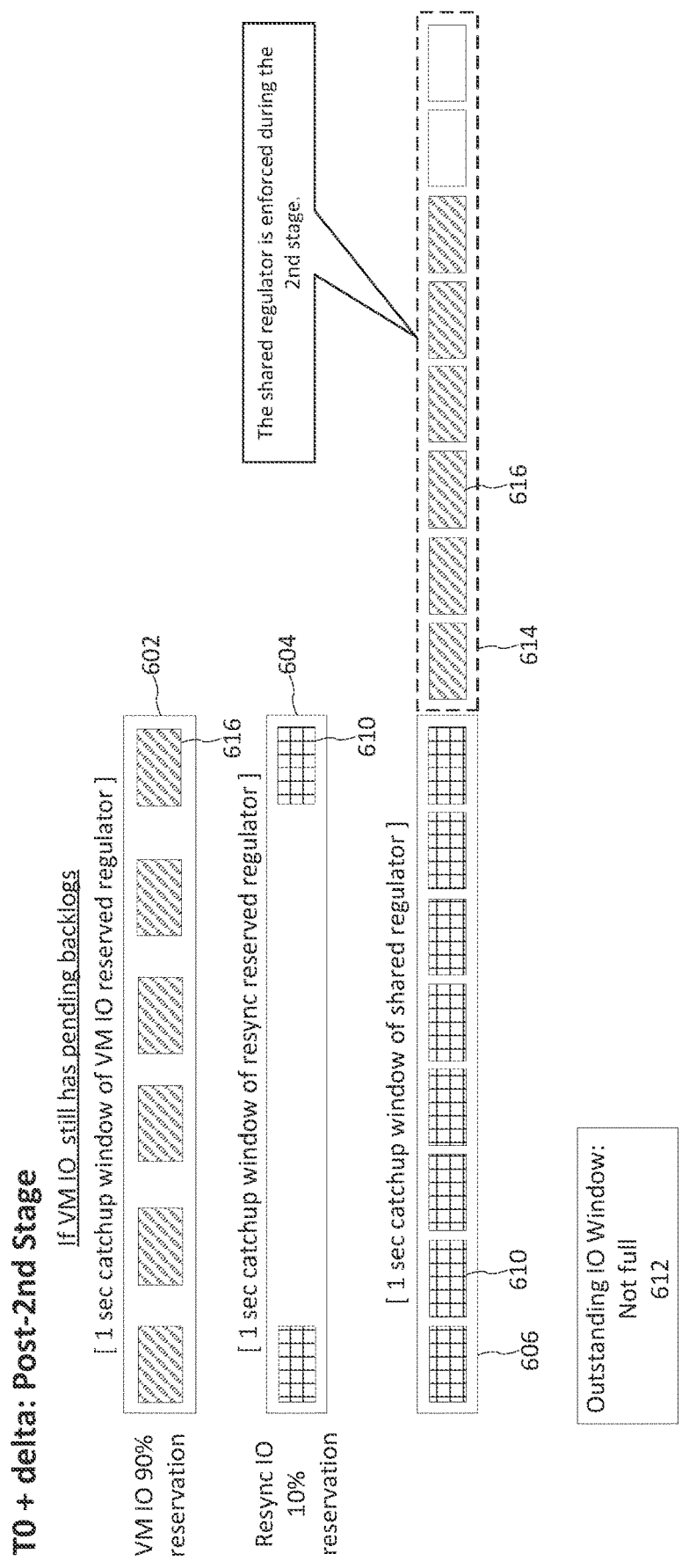
FIG. 6D illustrates an exemplary snapshot of class-specific regulators, a shared regulator, and an outstanding IO window at a time occurring after the initial time, after the first stage of the IO scheduling technique has executed, and after a second stage of the IO scheduling technique has executed.

FIG. 6D illustrates a snapshot of the IO scheduling technique as begun in FIG. 6A but at a later time, T0+ delta, and after a second stage of the IO scheduling technique has executed. At this point, the VM reserved regulator 602 is full, the resync reserved regulator 604 is full, and the shared regulator 606 is full and has been overflowed. In some embodiments, the second stage of the IO scheduling technique runs a deficit round robin scheduling algorithm along with enforcing the shared regulator 606 and the outstanding IO window 612. If the catchup time window of the shared regulator 606 still had unused slots 608 and the outstanding IO window 612 is not full, more pending IOs can be scheduled during the second stage in a round robin way. However, although the outstanding IO window 612 is pictured as not full, no additional IOs are scheduled during the second stage in 6D because the shared regulator 606 is full.

FIGS. 7A-7D are a series of sequential snapshots demonstrating how the IO scheduling technique accounts for the outstanding IO window 714 becoming full while the IO scheduling technique is executing in some embodiments. In addition to class-specific reserved regulators and a shared regulator, this IO scheduling technique enforces a limit on the total number of outstanding IO and the total number of outstanding IOs, as regulated by an outstanding IO window 714. The IO scheduling technique will not continue running unless outstanding IO window 714 still has available capacity. As discussed above, in both the first stage and the second stage, if the outstanding IO window becomes full, the IO scheduling technique will stop/be halted, and will be restarted when outstanding IOs are completed from the underlying disk layer.

Figure 7A:
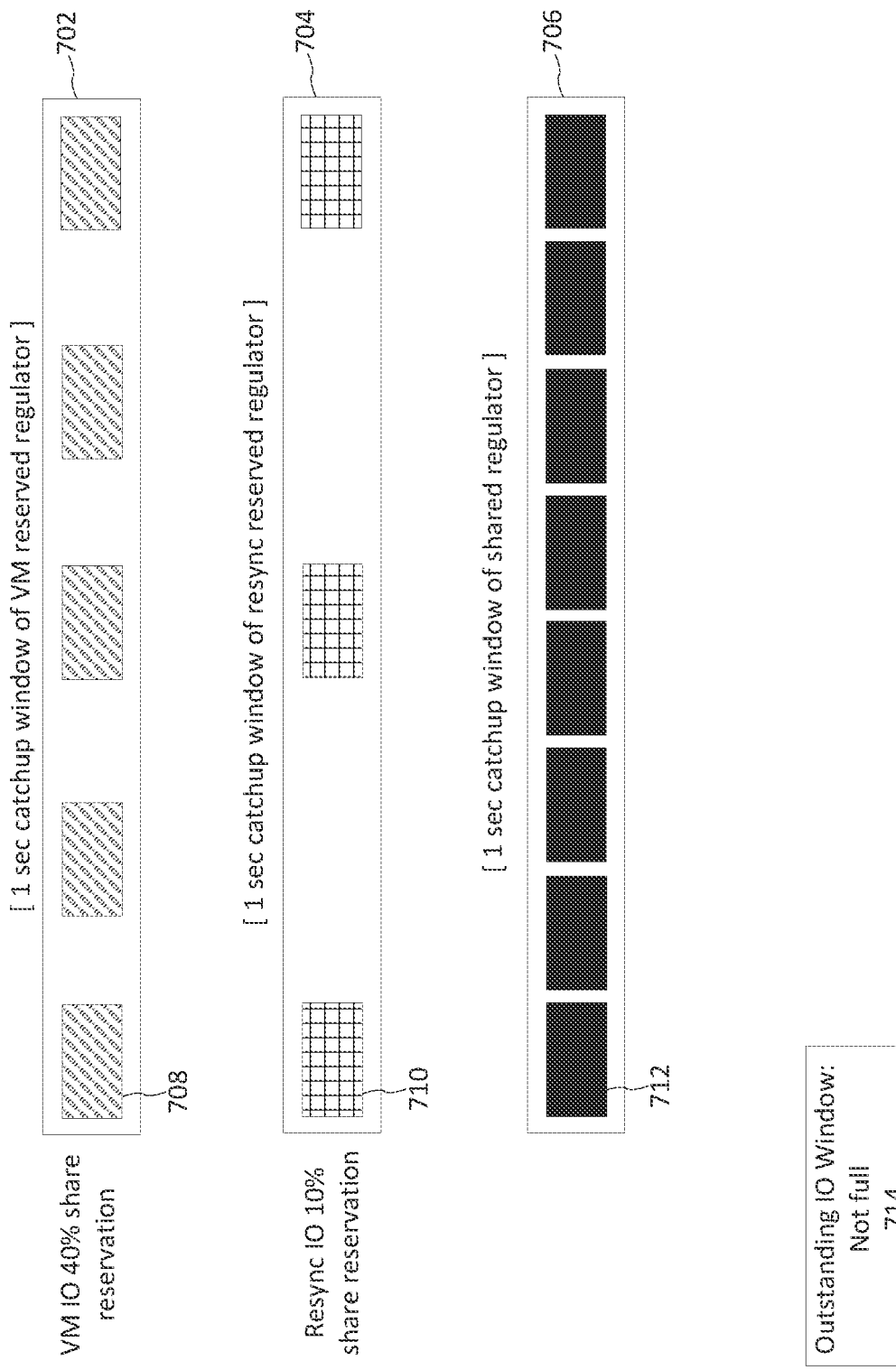
FIG. 7A illustrates an exemplary snapshot of class-specific regulators, a shared regulator, and an outstanding IO window at an initial time.

FIG. 7A is a snapshot of the relevant IO scheduling technique components at an initial time T0. FIG. 7A shows that, at time T0, the VM reserved regulator 702 is completely full of VM IOs 708, the resync reserved regulator 704 is completely full of resync IOs 710, the shared regulator 706 is full of used IO slots 712, and the outstanding IO window 714 is not yet full.

Figure 7B:
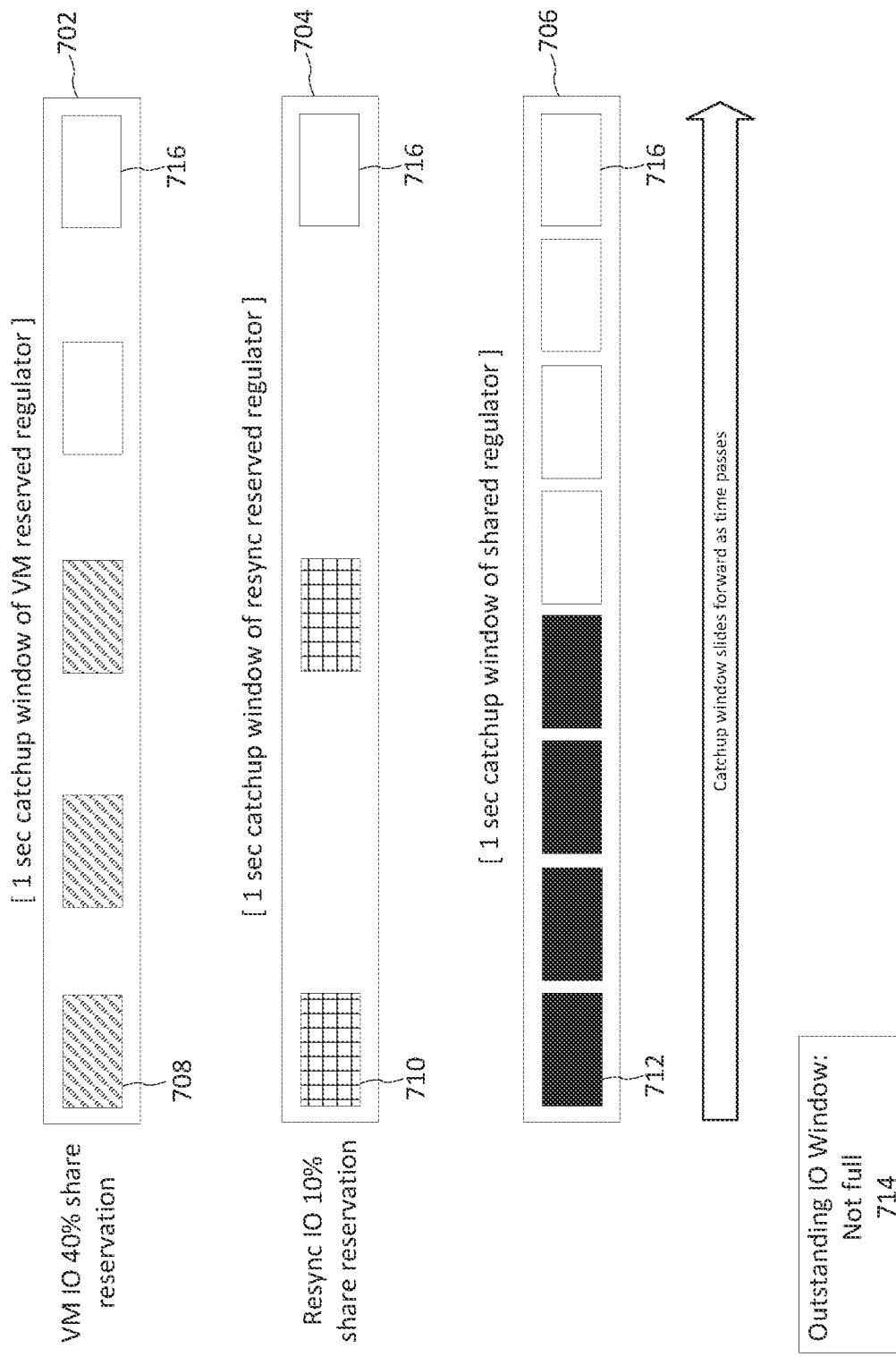
FIG. 7B illustrates an exemplary snapshot of class-specific regulators, a shared regulator, and an outstanding IO window at a time occurring after the initial time, but before a first stage of the IO scheduling technique has executed.

FIG. 7B illustrates a snapshot of the IO scheduling technique as begun in FIG. 7A but at a later time, T0+ delta. FIG. 7B illustrates the stage in the IO scheduling technique at which time has passed, so the catchup window has slid forward. At this time, there are now newly availably unused slots 716 in the VM reserved regulator 702, the resync reserved regulator 704, and the shared regulator 706. In particular, the VM reserved regulator 702 is shown with two unused slots 716, the resync reserved regulator 704 is shown with one unused slot 716, and the shared regulator 706 is shown with four unused slots 716. In addition, FIG. 7B indicates that the IO window 714 is still not full. This is consistent with the fact that no additional IOs have been scheduled between FIG. 7A and FIG. 7B.

Figure 7C:
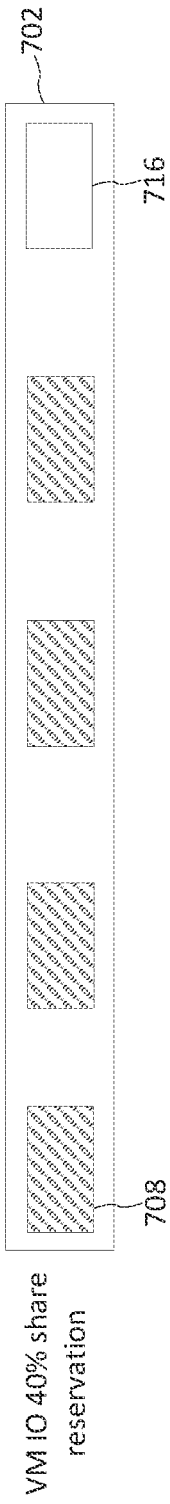
FIG. 7C illustrates an exemplary snapshot of class-specific regulators, a shared regulator, and an outstanding IO window at a time occurring after the initial time, after a first stage of the IO scheduling technique has executed, but before a second stage of the IO scheduling technique has executed.
Figure 7C:
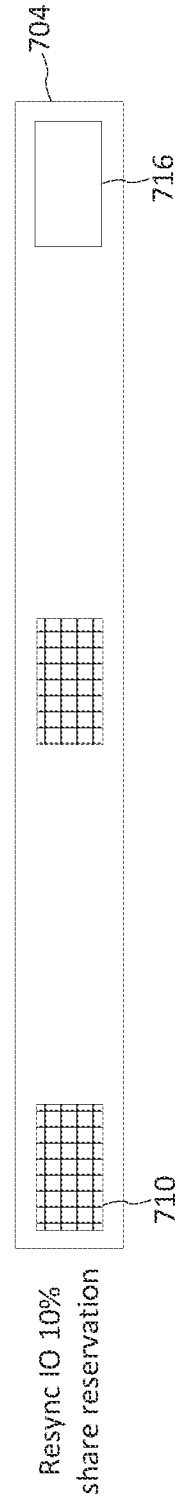
Figure 7C:
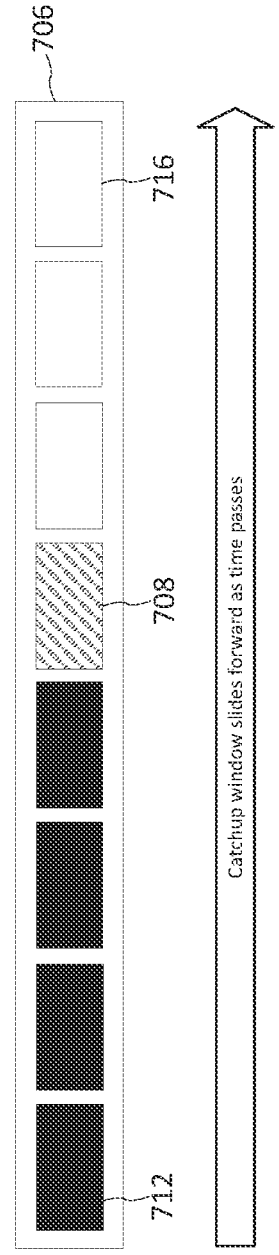

FIG. 7C illustrates a snapshot of the IO scheduling technique as begun in FIG. 7A but at a later time, T0+ delta, and after a first stage of the IO scheduling technique has executed. At this point, one additional IO, a VM IO 708, has been scheduled, as indicated by the VM IO 708 added to the VM reserved regulator 702 and to the shared regulator 706. However, although there are additional VM IOs 708 and resync IOs 710 (not pictured) available in their respective queues, no additional IOs are scheduled because the outstanding IO window 714 has become full.

Figure 7D:
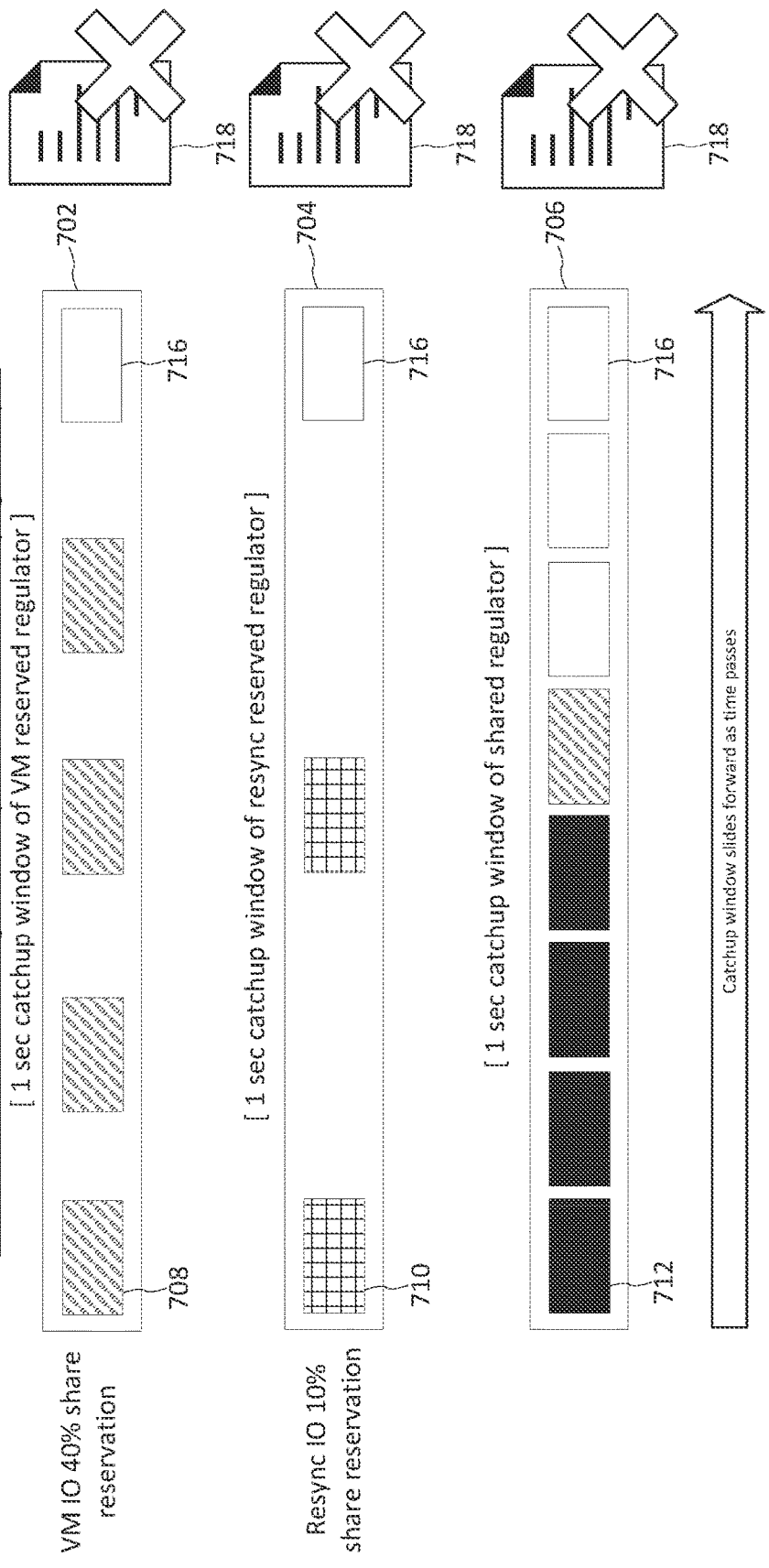
FIG. 7D illustrates an exemplary snapshot of class-specific regulators, a shared regulator, and an outstanding IO window at a time occurring after the initial time, after the IO scheduling technique has halted because the outstanding IO window is full.

FIG. 7D illustrates a snapshot of the IO scheduling technique begun in FIG. 7A but at a later time, T0+ delta, after the outstanding IO window 714 has become full. As discussed above, the IO scheduling technique stops when the outstanding IO window 714 fills up, and is restarted when outstanding IOs are completed from an underlying disk layer. Thus, the IO scheduling stops and does not proceed to the second stage of the IO scheduling technique. Stop indicators 718 indicate that no additional IOs are added to VM reserved regulator 702, resync reserved regulator 704, or shared regulator 706 after the outstanding IO window 714 becomes full.

Figure 8:
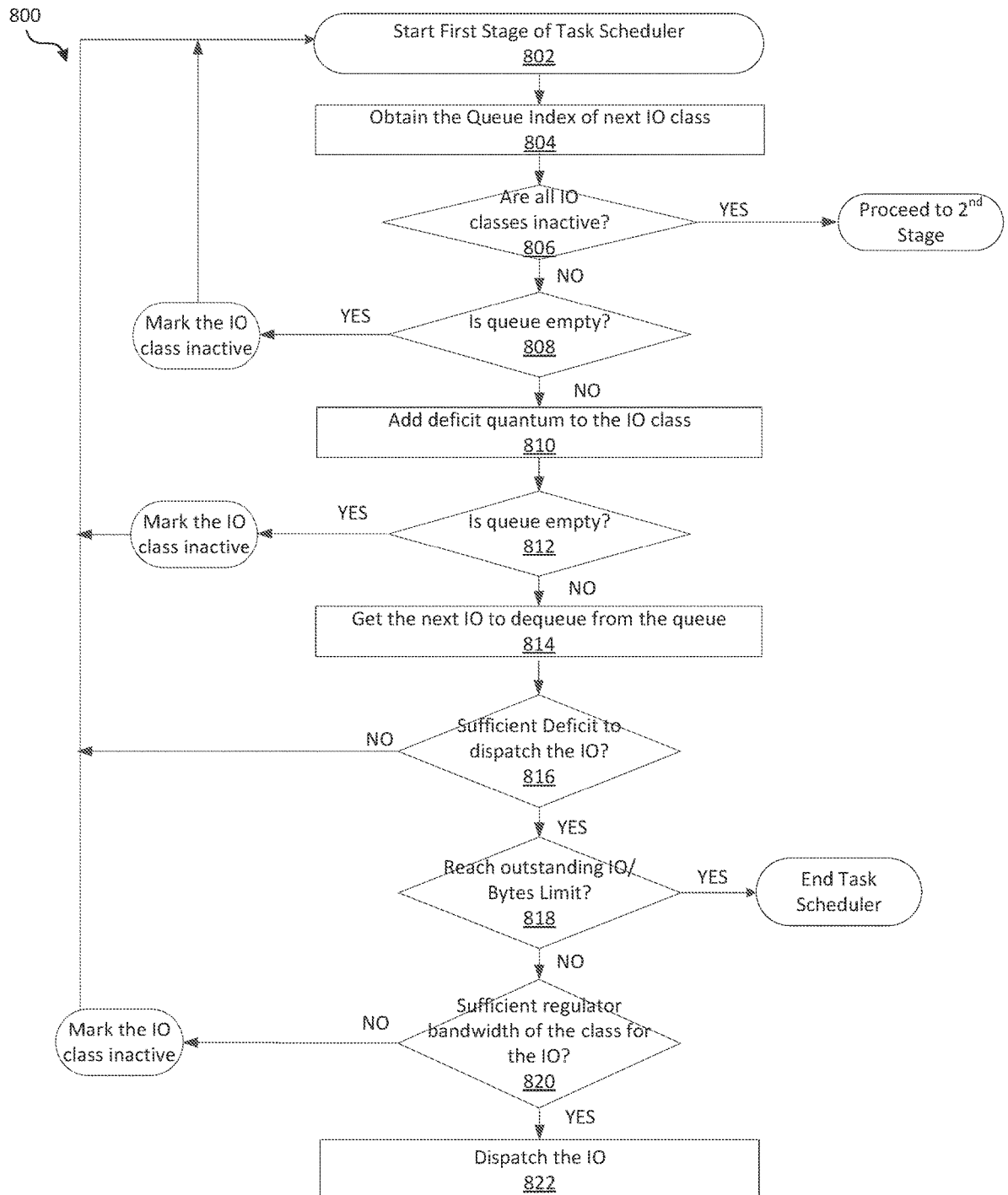
FIG. 8 illustrates an exemplary flowchart detailing exemplary steps of the first stage of the IO scheduling technique.

FIG. 8 is a flowchart illustrating first stage 800 of the IO scheduling technique, in accordance with some embodiments. The first stage 800 is performed, for example, in a vSAN containing one or more storage nodes of a cluster of storage nodes operating in the cloud-computing environment. In some embodiments, the distributed-computing system comprises a plurality of storage nodes or host computing devices (e.g., host computing device 100 described in reference to FIG. 1A) that are communicatively coupled together in a vSAN. In some embodiments, the distributed-computing system is implemented by one or more virtual machines (e.g., VM 102 described in reference to FIGS. 1A-1B). In some embodiments, the operations of the first stage 800 are distributed across the various systems (e.g., storage nodes) of the distributed-computing system. In the first stage 800, some components, are optionally combined, the arrangement of some components is optionally changed, and some components are, optionally added or omitted. In some embodiments, additional operations may be performed in combination with the first stage 800.

FIG. 8 illustrates individual steps that may be carried out within the above-described system as part of the first stage of the first stage 800.

In some embodiments, first stage 800 begins at step 802 at which first stage 800 is initiated.

At step 804, the queue index of a next IO class is obtained. In some embodiments, there may be multiple IO classes.

At step 806, a check is performed to see if all IO classes are inactive. If all of the IO classes are inactive, the first stage 800 proceeds to the second stage. If at least one of the IO classes is active, it proceeds to step 808.

At step 808, a check is performed to determine if the queue corresponding to an IO class is empty. If the queue of the IO class is empty, then there are no pending IO tasks waiting to be dispatched for that class type. If the queue is empty, then the IO class type is marked as inactive. If the queue is not marked as empty, it proceeds to step 810.

At step 810, a deficit quantum is added to the current IO class. In some embodiments, the deficit quantum may be a percentage of an outstanding IO window capacity. In some embodiments, the deficit quantum may be added to a previous surplus deficit value from a previous round of dispatching IOs. As discussed above, the deficit quantum may correspond to a number of bytes corresponding to the IO class's expected share may be allocated so that a portion of the IO class's pending IOs may be dispatched.

At step 812, a check is performed to determine if the queue corresponding to an IO class is empty. If the queue of the IO class is empty, then there are no pending IO tasks waiting to be dispatched for that class type. If the queue is empty, then the IO class type is marked as inactive. If the queue is not marked as empty, it proceeds to step 814.

At step 814, a next IO is dequeued from its queue. In some embodiments, this may correspond to an IO task for a first IO class being removed from the queue so that it can be scheduled and/or dispatched.

At step 816, a check is performed to determine if there is sufficient deficit to dispatch the dequeued IO from step 814, above. In some embodiments, a payload corresponding to bandwidth required to dispatch the dequeued IO is compared against the bandwidth value of the quantum deficit for the first IO class. If the quantum deficit for the first IO class is less than the payload corresponding to the dequeued IO task, then first stage 800 returns to step 802 of first stage 800. If the quantum deficit for the first IO class is greater than or equal to the payload corresponding to the dequeued IO task, then first stage 800 proceeds to step 818. As discussed above, deficit may a set number of bytes that may be used up/consumed when an IO task is scheduled or dispatched. Thus, step 816 may correspond to determining whether the IO class has enough bytes remaining in its deficit to "spend" on the next pending IO task.

At step 818, a check is performed to determine whether an outstanding IO/bytes limit has been reached. In some embodiments, the outstanding IO/bytes limit places a limit on the number of outstanding bytes and/or the total number of outstanding IOs for the IO scheduling technique to continue. In some embodiments, if the outstanding IO/bytes limit is reached, then first stage 800 ends, and will restart only after outstanding IOs are completed at the underlying level. In some embodiments, if the outstanding IO/bytes limit is not yet reached, then first stage 800 proceeds to step 820. As discussed above, the outstanding IO/bytes limit may correspond to the cap on the total number of outstanding IOs and/or the total bytes of the outstanding IOs.

At step 820, a check it performed to determine whether there is regulator bandwidth of the class for the IO. In some embodiments, step 820 corresponds to checking to see if there are available IOPS and/or time slices in a reserved regulator corresponding to a first class of IOs. In some embodiments, if there is not sufficient regulator bandwidth of the class for the IO, then first stage 800 marks the IO class as inactive and returns to step 802. In some embodiments, if there is sufficient regulator bandwidth of the class for the IO, then first stage 800 proceeds to step 822. As discussed above, the reserved regulator may enforce a limit on the number of IOPS scheduled for a particular IO class, so step 820 may correspond to determining whether the number of I/O operations scheduled within a given time period will/ would exceed a maximum number of allotted I/O operations.

At step 822, the IO that was dequeued at step 814 is dispatched. In some embodiments, step 822 involves scheduling the task for dispatch and data is copied from a first storage node in a first vSAN to a second storage node in the first vSAN.

Figure 9:
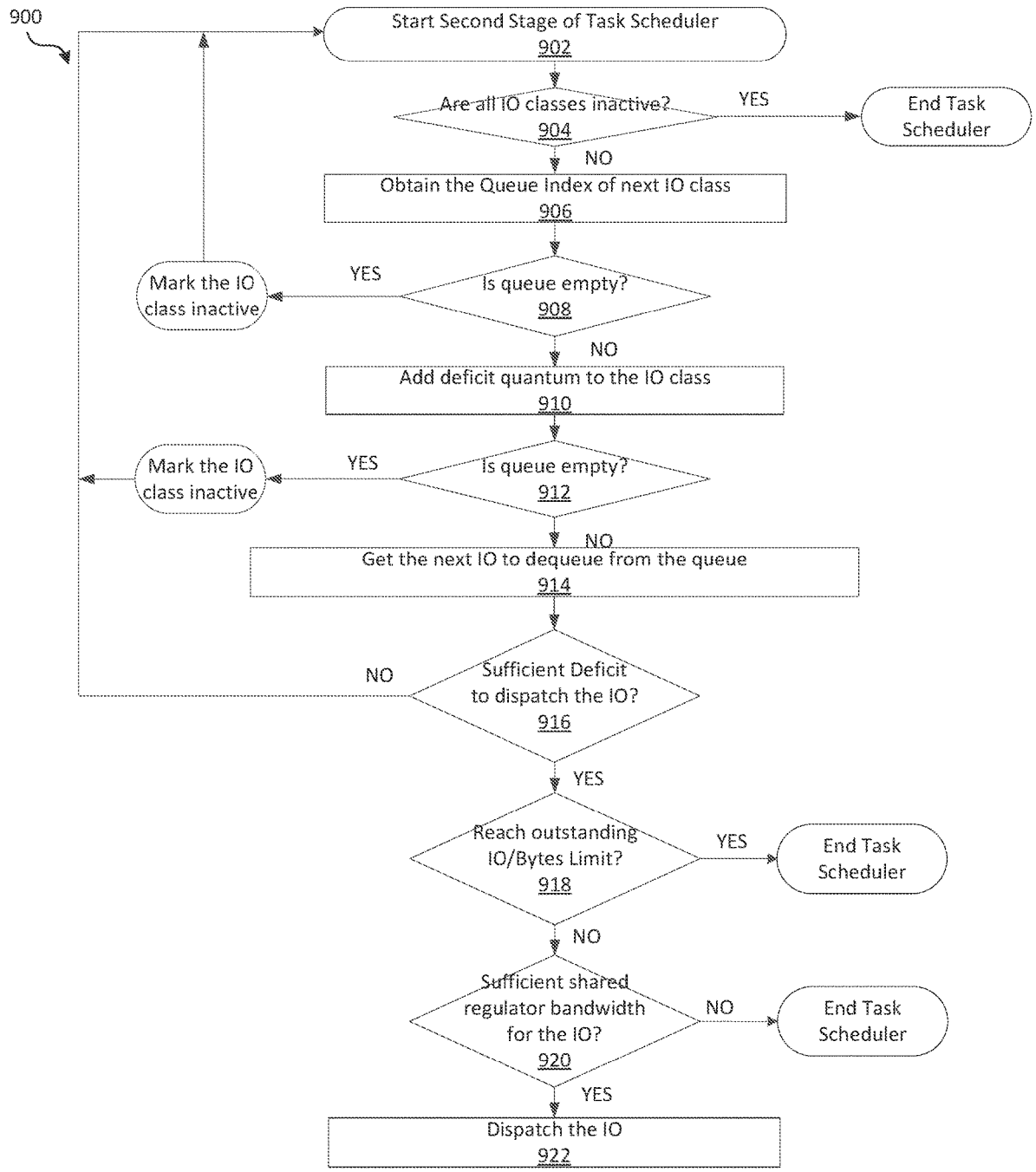
FIG. 9 illustrates an exemplary flowchart detailing exemplary steps of the second stage of the IO scheduling technique.

FIG. 9 is a flowchart illustrating second stage 900 of the IO scheduling technique, in accordance with some embodiments. Second stage 900 is performed, for example, in a vSAN containing one or more storage nodes of a cluster of storage nodes operating in the cloud-computing environment. In some embodiments, the distributed-computing system comprises a plurality of storage nodes or host computing devices (e.g., host computing device 100 described in reference to FIG. 1A) that are communicatively coupled together in a vSAN. In some embodiments, the distributed-computing system is implemented by one or more virtual machines (e.g., VM 102 described in reference to FIGS. 1A-1B). In some embodiments, the operations of second stage 900 are distributed across the various systems (e.g., storage nodes) of the distributed-computing system. In second stage 900, some components are optionally combined, the arrangement of some components is optionally changed, and some components are optionally added or omitted. In some embodiments, additional operations may be performed in combination with second stage 900.

FIG. 9 illustrates individual steps that may be carried out within the above-described system as part of second stage 900 of the IO scheduling technique.

Second stage 900 begins at step 902 at which second stage 900 is initiated.

At step 904, a check is performed to see if all IO classes are inactive. If all of the IO classes are inactive, then second stage 900 ends. If at least one of the IO classes is active, then it proceeds to step 906.

At step 906, the queue index of a next IO class is obtained. In some embodiments, there may be multiple IO classes.

At step 908, a check is performed to determine if the queue corresponding to an IO class is empty. If the queue of the IO class is empty, then there are no pending IO tasks waiting to be dispatched for that class type. If the queue is empty, then the IO class type is marked as inactive. If the queue is not marked as empty, then second stage 900 proceeds to step 910.

At step 910, a deficit quantum is added to the current IO class. In some embodiments, the deficit quantum may be a percentage of an outstanding IO window capacity. In some embodiments, the deficit quantum may be added to a previous surplus deficit value from a previous round of dispatching IOs.

At step 912, a check is performed to determine if the queue corresponding to an IO class is empty. If the queue of the IO class is empty, then there are no pending IO tasks waiting to be dispatched for that class type. If the queue is empty, then the IO class type is marked as inactive. If the queue is not marked as empty, then second stage 900 proceeds to step 914.

At step 914, a next IO is dequeued from its queue. In some embodiments, this may correspond to an IO task for a first IO class being removed from the queue so that it can be scheduled and/or dispatched.

At step 916, a check is performed to determine if there is sufficient deficits corresponding to the IO class of the dequeued IO to dispatch the dequeued IO from step 914, above. In some embodiments, a payload corresponding to bandwidth required to dispatch the dequeued IO is compared against the bandwidth value of the quantum deficit for the first IO class. If the quantum deficit for the first IO class is less than the payload corresponding to the dequeued IO task, then second stage 900 returns to step 902. If the quantum deficit for the first IO class is greater than or equal to the payload corresponding to the dequeued IO task, then second stage 900 proceeds to step 918. As discussed above, deficits may a set number of bytes that may be used up/consumed when an IO task is scheduled or dispatched. Thus, step 916 may correspond to determining whether the IO class has enough bytes remaining in its deficit to "spend" on the next pending IO task.

At step 918, a check is performed to determine whether an outstanding IO/bytes limit has been reached. In some embodiments, the outstanding IO/bytes limit places a limit on the number of outstanding bytes and/or the total number of outstanding IOs for the IO scheduling technique to continue. In some embodiments, if the outstanding IO/bytes limit is reached, then second stage 900 ends, and will restart only after outstanding IOs are completed at the underlying level. In some embodiments, if the outstanding IO/bytes limit is not yet reached, then second stage 900 proceeds to step 920. As discussed above, the outstanding IO/bytes limit may correspond to the cap on the total number of outstanding IOs and/or the total bytes of the outstanding IOs.

At step 920, a check it performed to determine whether there is availability in the shared regulator. In some embodiments, step 920 corresponds to checking to see if there are available IOPS and/or time slices in a shared regulator. In some embodiments, if there is not sufficient regulator bandwidth in the shared regulator, then second stage 900 ends. In some embodiments, if there is sufficient regulator bandwidth in the shared regulator, then the second stage 900 proceeds to step 922. As discussed above, the shared regulator may enforce a limit on the number of IOPS scheduled for all of the IO classes combined, so step 920 may correspond to determining whether the number of I/O operations scheduled within a given time period will/would exceed a maximum number of allotted I/O operations.

At step 922, the IO that was dequeued at step 914 is dispatched. In some embodiments, step 922 involves scheduling the task for dispatch and data is copied from a first storage node in a first vSAN to a second storage node in the first vSAN.

Figure 10:
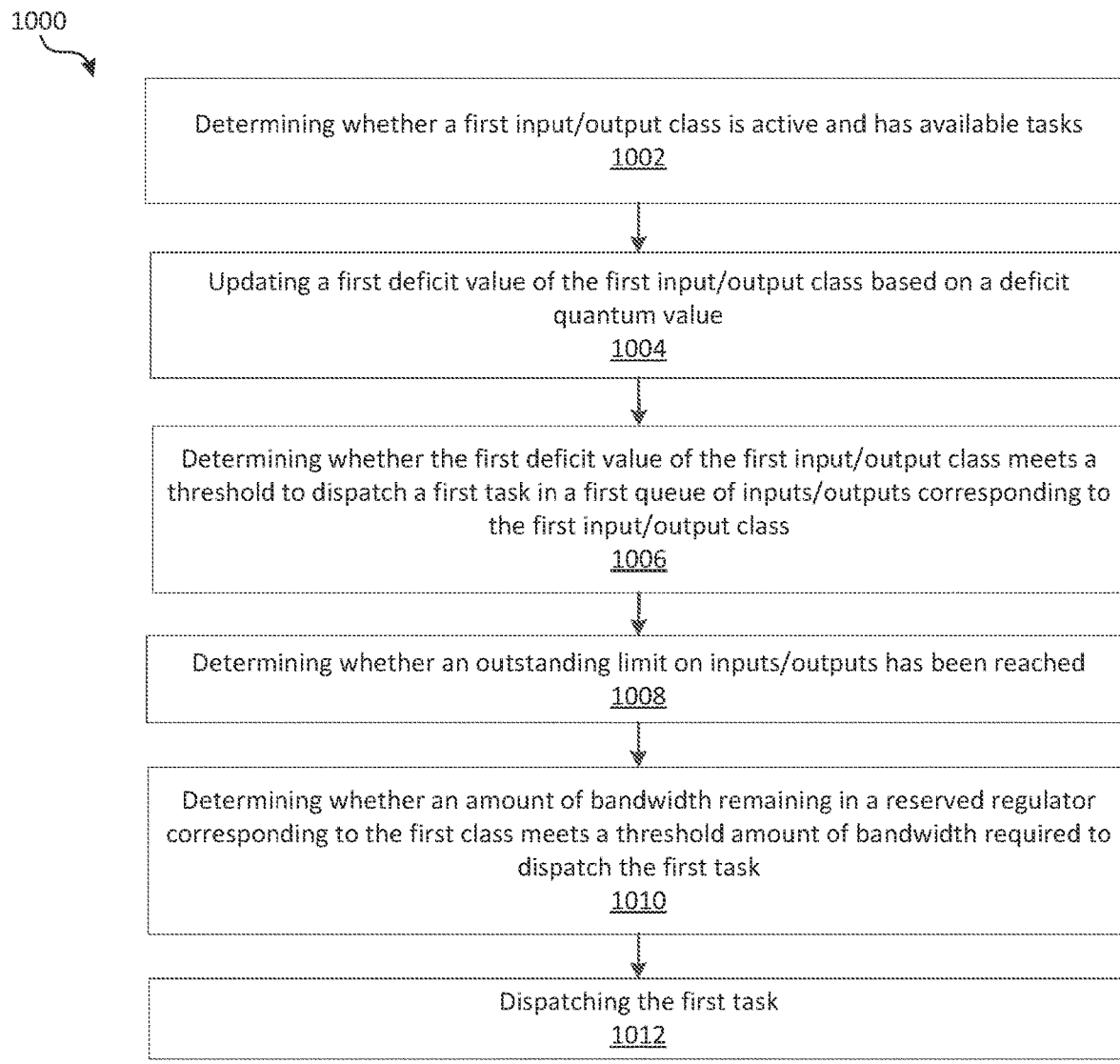
FIG. 10 illustrates an exemplary flowchart detailing exemplary steps of the IO scheduling technique.

FIG. 10 is a flowchart illustrating individual steps involved in the IO scheduling technique according to some embodiments.

At step 1002, a determination is made about whether a first input/output class is active and has available tasks. As described above, the first input/output class is active and has available tasks if it has pending IOs waiting to be dispatched. As described above, an IO class is marked as inactive if it does not have any pending IOs. In some embodiments, the first input/output class corresponds to a type of inputs/outputs received within the distributed computing system.

If the first IO class is found to be inactive, the IO scheduling technique may proceed to a second IO class as described above. In some embodiments, proceeding to the second IO class may involve determining whether a second input/output class is active and has available tasks. In some embodiments, in accordance with determination that the second input/output class is active and has available tasks, the second deficit value of the second input/output class may be updated (added with) a second deficit quantum value, as described above. After the second deficit value is updated, a determination about whether the second deficit value meets a threshold value required to dispatch a second task in a second queue of inputs/outputs corresponding to the second input/output class may be made. As described above, this may correspond to a determination about whether there are enough bytes in the deficit value for the next IO to be dispatched/scheduled. In some embodiments, scheduling tasks for the second IO class will still involve a determination about whether an outstanding limit on inputs/outputs has been reached, as described above. As with the first IO class, scheduling IOs of the second IO class may involve a determination about whether the amount of bandwidth remaining in the reserved regulator of the second class is sufficient to dispatch the second task. As described above, if the reserved regulator of the second IO class has enough resources (IOPS) to dispatch the second task, then the outstanding limit on inputs/outputs has not been reached, and the second deficit value (bytes) is high enough to dispatch the next task, the next task may be dispatched.

In some embodiments, in accordance with a determination that the outstanding limit on inputs/outputs has been reached, the IO scheduling technique may forego scheduling additional tasks at least until a plurality of outstanding tasks have been completed. As described above, the outstanding limit on inputs/outputs may correspond to an outstanding IO window placing a limit on the overall number of outstanding IOs and/or bytes of outstanding IOs. Once the outstanding IO limit is reached, IO scheduling may stop, and may be restarted once outstanding IOs have been able to dispatch from the underlying media layer.

In some embodiments, in accordance with a determination that the plurality of input/output classes includes at least a first input/output class that is active, a queue index of the first input/output class may be determined. In some embodiments, after the queue index of the first input/output class is determined, a determination about whether the queue of inputs/outputs corresponding to the first input/output class may be made. Conversely, in some embodiments, in accordance with a determination that the plurality of input/output classes does not include any active input/output classes, additional tasks may not be scheduled.

In some embodiments, in response to a determination that the first queue of inputs/outputs corresponding to the first input/output class is empty (e.g., that it does not have any available tasks), the first input/output class may be marked as inactive. As discussed above, once a class is inactive, the IO scheduling technique may move on to scheduling tasks corresponding to other IO classes. Once all of the IO classes are marked as inactive, the IO scheduling technique may move onto the second stage if it is in the first stage, or if it is already in the second stage, the IO scheduling technique may end.

At step 1004, a first deficit value of a first input/output class is updated based on a deficit quantum value. In some embodiments, the first input/output class can be updated by adding a deficit quantum value. In some embodiments, the deficit quantum value that is added to the first deficit value of the first input/output class may be based on a percentage of the outstanding IO bytes limit and/or the expected share of the IO class. For example, in some embodiments, an IO class that is expected to have a share of 40% may have 4× the deficit quantum value added to its deficit value as compared to an IO class with an expected share of 10%. As described above, the deficit quantum value may be added to a first deficit value of the IO class where the first deficit value of the IO class is non-zero, having carried over excess deficit value from a previous round of scheduling. For example, in some embodiments, if only half of the deficit value of a first IO class is consumed in a first round of scheduling, then that excess deficit value may carry over and be increased by the deficit quantum value in a subsequent round of scheduling for the first IO class. As discussed above, in some embodiments, the first deficit value of the first input/output class is updated after a determination is made that the first input/output class is active and has available tasks.

At step 1006, a determination is made about whether the first deficit value of the first input/output class meets a threshold to dispatch a first task in a first queue of inputs/outputs corresponding to the first input/output class. In some embodiments, determining whether the first deficit value of the first input/output class meets the threshold to dispatch a first task in the first queue of inputs/outputs corresponding to the first input/output class corresponds to comparing the first deficit value against the amount of resources required to dispatch the next task in first queue of inputs/outputs. As discussed above, this determination may correspond to checking whether the first deficit value has enough remaining bytes for the pending IO to be dispatched/scheduled. For example, if the deficit value is 5 bytes, and 6 bytes are required to dispatch the next task, then the first deficit value would not meet the threshold to dispatch that task. If, however, the first deficit value is 5 bytes, and it would require only 2 bytes to dispatch the next task, then the first deficit value would meet the threshold to dispatch the next task. In some embodiments, the determination is made after the first deficit value is updated based on the deficit quantum value.

In some embodiments, in accordance with a determination that the deficit value of the first input/output class is not larger than the value required to dispatch the first task, dispatching of the first task is foregone. As described above, this may correspond to comparing the deficit value of the first IO class against the value required to dispatch the next task. As discussed above, this may correspond to determining whether the first deficit value has enough bytes to dispatch/schedule the pending IO task. If the deficit value of the first IO class is larger than the value required to dispatch the next task, then the determination may be that the deficit value of the first IO class is large enough to dispatch the first task. If the deficit value of the first IO class is smaller than the value required to dispatch the next IO task, then the determination may be that deficit value of the first IO class is not large enough to dispatch the first task.

At step 1008, a determination is made about whether an outstanding limit on inputs/outputs has been reached. In some embodiments, the outstanding limit on inputs/outputs may require that no more than a set number of IOs and/or a number of bytes of outstanding IOs are pending while the IO scheduling technique is running. As discussed above, this limit may help address underlying congestion, and prevent an overly large number of outstanding IOs from building up.

At step 1010, a determination is made about whether an amount of bandwidth remaining in a reserved regulator corresponding to the first IO class meets a threshold amount of bandwidth required to dispatch the first task. As described above, this determination may correspond to a determination about whether the reserved regulator contains a sufficient number of unused IOPS for the first task to dispatch. For example, if there are no remaining IOPS available in the reserved regulator, then the remaining bandwidth remaining in the reserved regulator is will not meet the threshold amount of bandwidth required to dispatch the first task.

At step 1012, a first task is dispatched. In some embodiments, the IO scheduling technique continues dispatching IOs as long as certain conditions are met. The certain conditions may vary depending on whether the IO scheduling technique is in its first stage or its second stage. For example, as discussed above, in its first stage, pending IOs will continue to be dispatched until the IO class runs out of pending IOs, runs out of reserved deficits, its outstanding IO window becomes full, or its reserved IOPS regulator runs out of time slices. In its second stage, as discussed above, pending IOs will continue to be dispatched until the IO class runs out of pending IOs, runs out of shared deficits, or until the outstanding IO window is full.

In some embodiments, after dispatching the first task, a determination is made about whether a first input/output class is active and has available tasks. If the first input/output class is active and has available tasks, a first deficit value of the first input/output class may be updated based on a second deficit quantum value. As described above, updating the first deficit value may correspond to adding a deficit quantum value to a preexisting first deficit value corresponding to the class, which may have rolled over deficit value from a previous round of scheduling. After the first deficit value is updated based on the second deficit quantum value, a determination may be made about whether the first deficit value of the first input/output class meets a threshold value required to dispatch a second task in the first queue of inputs/outputs corresponding to the first input/output class. In some embodiments, a determination may be made about whether an outstanding limit on inputs/outputs has been reached. As described above, the outstanding limit on inputs/outputs may correspond to a limit on the bytes of outstanding IOs, or the total number of outstanding IOs. In some embodiments, the method includes determining whether an amount of bandwidth remaining in a shared regulator meets a threshold amount of bandwidth required to dispatch the second task. As described above, this determination may correspond to determining whether there are sufficient unused slots in the shared regulator to dispatch the next IO. In some embodiments, if the first deficit value is high enough to dispatch the second task in the first queue of inputs/outputs corresponding to the first input/output class, the outstanding limit on inputs/outputs has not been reached, and the amount of bandwidth remaining in the shared regulator meets a threshold amount of bandwidth required to dispatch the second task, the second task will be dispatched.

In some embodiments, after the first task is dispatched, the first deficit value is decremented based on the value required to dispatch the first task, and a value corresponding to the resources required to dispatch the first task is recorded in a shared regulator. As described above, decrementing the value required to dispatch the first task from the first deficit value corresponds to using up the limited number of resources permitted to be used for the first IO class by the deficit value. When all of the resources allocated for the first IO class in the first deficit value are used up, the IO scheduling technique will move on to the next IO class. Recording the value corresponding to the resources required to dispatch the first task in the shared regulator similarly corresponds to marking resources (e.g., IOPS) as used so that an excess of IOs will not be dispatched in a given time period beyond those allowed by the shared regulator. As discussed above, however, the shared regulator has a catchup window that slides forward, so additional unused slots may become available as time passes.

In some embodiments, after the first task is dispatched and the value corresponding to the resources required to dispatch the first task has been recorded in the shared regulator, a determination may be made about whether the first input/output class is active and has available tasks. If the first input/output class is still active and has available tasks, a determination may be made about whether the first deficit value meets a threshold value required to dispatch a second task in the first queue of inputs/outputs corresponding to the first input/output class. A determination may be made about whether the amount of bandwidth remaining in the reserved regulator corresponding to the first class meets a threshold amount of bandwidth required to dispatch the second task. Then, in accordance with a determination that the first deficit value meets the threshold value required to dispatch the second task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, the second task may be dispatched.

In some embodiments, the first task is dispatched in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task.

In accordance with some implementations, a computer-readable storage medium (e.g., a non-transitory computer-readable storage medium) provides a computer-readable storage medium storing one or more programs for execution by one or more processors of an electronic device and one or more programs including instructions for performing any of the methods or processes described herein.

In accordance with some implementations of a distributed computing system, the system will comprise one or more processors, memory storing one or more programs configured to be executed by the one or more processors, and one or more programs including instructions for performing any of the methods or processes described herein.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. A method of scheduling tasks in a distributed computing system, the method comprising:
    determining whether a first input/output class is active and has available tasks, wherein the first input/output class corresponds to a type of inputs/outputs received within the distributed computing system;
    after determining that the first input/output class is active and has available tasks, updating a first deficit value of the first input/output class based on a deficit quantum value;
    after updating the first deficit value based on the deficit quantum value, determining whether the first deficit value of the first input/output class meets a threshold to dispatch a first task in a first queue of inputs/outputs corresponding to the first input/output class;
    determining whether an outstanding limit on inputs/outputs has been reached;
    determining whether an amount of bandwidth remaining in a reserved regulator corresponding to the first class meets a threshold amount of bandwidth required to dispatch the first task; and
    in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

2. The method of claim 1, further comprising:
    after dispatching the first task, determining whether a first input/output class is active and has available tasks;
    after determining that the first input/output class is active and has available tasks, updating the first deficit value of the first input/output class based on a second deficit quantum value;
    after updating the first deficit value based on the second deficit quantum value, determining whether the first deficit value of the first input/output class meets a threshold value required to dispatch a second task in the first queue of inputs/outputs corresponding to the first input/output class;
    determining whether an outstanding limit on inputs/outputs has been reached;
    determining whether an amount of bandwidth remaining in a shared regulator meets a threshold amount of bandwidth required to dispatch the second task; and
    in accordance with a determination that the first deficit value meets the threshold value required to dispatch the second task in the first queue of inputs/outputs corresponding to the first input/output class, that the outstanding limit on inputs/outputs has not been reached, and that the amount of bandwidth remaining in the shared regulator meets a threshold amount of bandwidth required to dispatch the second task, dispatching the second task.

3. The method of claim 1, further comprising:
    after dispatching the first task:
        decrementing the first deficit value based on the value required to dispatch the first task; and
        recording a value corresponding to the resources required to dispatch the first task in a shared regulator.

4. The method of claim 3, further comprising:
    after dispatching the first task, determining that the first input/output class is active and has available tasks;
    after determining that the first input/output class is active and has available tasks and recording the value corresponding to the resources required to dispatch the first task in the shared regulator:
        determining whether the first deficit value meets a threshold value required to dispatch a second task in the first queue of inputs/outputs corresponding to the first input/output class;
        determining whether the outstanding limit on inputs/outputs has been reached; and
        determining whether the amount of bandwidth remaining in the reserved regulator corresponding to the first class meets a threshold amount of bandwidth required to dispatch the second task;
        in accordance with a determination that the first deficit value meets the threshold value required to dispatch the second task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the second task.

5. The method of claim 4, further comprising:
    while the first input/output class is active and has available tasks, the outstanding limit on inputs/outputs has not been reached, the amount of bandwidth remaining in the reserved regulator corresponding to subsequent tasks meets a threshold amount of bandwidth required to dispatch subsequent tasks, and the first deficit value of the first input/output class meets a threshold value required to dispatch subsequent tasks of the first input/output class:
continuing to dispatch subsequent tasks corresponding to the first input/output class.

6. The method of claim 3, wherein the bandwidth in the reserved regulator corresponding to the first class is proportional to a share of the first input/output class relative to a plurality of input/output classes and a total number of resources of the shared regulator.

7. The method of claim 1, further comprising:
in accordance with a determination that there is not sufficient bandwidth remaining in the reserved regulator corresponding to the first class to dispatch the first task, marking the first input/output class as inactive; and
determining whether a second input/output class is active and has available tasks;
after determining that the second input/output class is active and has available tasks, updating a second deficit value of the second input/output class based on a second deficit quantum value;
after updating the second deficit value based on the second deficit quantum value, determining whether the second deficit value meets a threshold value required to dispatch a second task in a second queue of inputs/outputs corresponding to the second input/output class;
determining whether an outstanding limit on inputs/outputs has been reached;
determining whether an amount of bandwidth remaining in a reserved regulator corresponding to the second class meets a threshold amount of bandwidth required to dispatch the second task; and
in accordance with a determination that the second deficit value meets the threshold value required to dispatch the second task in the second queue of inputs/outputs corresponding to the second input/output class, that the outstanding limit on inputs/outputs has not been reached, and that the amount of bandwidth remaining in the reserved regulator corresponding to the second class meets a threshold amount of bandwidth required to dispatch the second task, dispatching the second task.

8. The method of claim 1, wherein determining that the first input/output class is active and has available tasks comprises:
determining whether a plurality of input/output classes includes any active input/output classes;
in accordance with a determination that the plurality of input/output classes includes at least a first input/output class that is active, determining a queue index of the first input/output class; and
after determining the queue index of the first input/output class, determining whether the queue of inputs/outputs corresponding to the first input/output class is empty.

9. The method of claim 1, further comprising:
in accordance with a determination that the plurality of input/output classes does not include any active input/output classes, foregoing scheduling additional tasks in the distributed computing system.

10. The method of claim 1, further comprising:
in response to a determination that the first queue of inputs/outputs corresponding to the first input/output class is empty, marking the first input/output class as inactive.

11. The method of claim 1, further comprising:
in response to a determination that the outstanding limit on inputs/outputs has been reached, foregoing scheduling tasks at least until a plurality of outstanding tasks have been completed.

12. The method of claim 1, further comprising:
in accordance with a determination that the deficit value of the first input/output class is not larger than the value required to dispatch the first task, foregoing dispatching the first task.

13. A non-transitory computer-readable storage medium storing one or more programs configured to be executed by a distributed computing system comprising one or more processors and memory, the one or more programs including instructions for performing operations comprising:
determining whether a first input/output class is active and has available tasks, wherein the first input/output class corresponds to a type of inputs/outputs received within the distributed computing system;
after determining that the first input/output class is active and has available tasks, updating a first deficit value of the first input/output class based on a deficit quantum value;
after updating the first deficit value based on the deficit quantum value, determining whether the first deficit value of the first input/output class meets a threshold to dispatch a first task in a first queue of inputs/outputs corresponding to the first input/output class;
determining whether an outstanding limit on inputs/outputs has been reached;
determining whether an amount of bandwidth remaining in a reserved regulator corresponding to the first class meets a threshold amount of bandwidth required to dispatch the first task; and
in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

14. The storage medium of claim 13, further comprising:
after dispatching the first task, determining whether a first input/output class is active and has available tasks;
after determining that the first input/output class is active and has available tasks, updating the first deficit value of the first input/output class based on a second deficit quantum value;
after updating the first deficit value based on the second deficit quantum value, determining whether the first deficit value of the first input/output class meets a threshold value required to dispatch a second task in the first queue of inputs/outputs corresponding to the first input/output class;
determining whether an outstanding limit on inputs/outputs has been reached;
determining whether an amount of bandwidth remaining in a shared regulator meets a threshold amount of bandwidth required to dispatch the second task; and
in accordance with a determination that the first deficit value meets the threshold value required to dispatch the second task in the first queue of inputs/outputs corresponding to the first input/output class, that the outstanding limit on inputs/outputs has not been reached, and that the amount of bandwidth remaining in the shared regulator meets a threshold amount of bandwidth required to dispatch the second task, dispatching the second task.

15. The storage medium of claim 13, further comprising:
after dispatching the first task:
  decrementing the first deficit value based on the value required to dispatch the first task; and
  recording a value corresponding to the resources required to dispatch the first task in a shared regulator.

16. The storage medium of claim 15, further comprising:
after dispatching the first task, determining that the first input/output class is active and has available tasks;
after determining that the first input/output class is active and has available tasks and recording the value corresponding to the resources required to dispatch the first task in the shared regulator:
  determining whether the first deficit value meets a threshold value required to dispatch a second task in the first queue of inputs/outputs corresponding to the first input/output class;
  determining whether the outstanding limit on inputs/outputs has been reached; and
  determining whether the amount of bandwidth remaining in the reserved regulator corresponding to the first class meets a threshold amount of bandwidth required to dispatch the second task;
in accordance with a determination that the first deficit value meets the threshold value required to dispatch the second task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the second task.

17. The storage medium of claim 16, further comprising:
while the first input/output class is active and has available tasks, the outstanding limit on inputs/outputs has not been reached, the amount of bandwidth remaining in the reserved regulator corresponding to subsequent tasks meets a threshold amount of bandwidth required to dispatch subsequent tasks, and the first deficit value of the first input/output class meets a threshold value required to dispatch subsequent tasks of the first input/output class:
  continuing to dispatch subsequent tasks corresponding to the first input/output class.

18. The storage medium of claim 15, wherein the bandwidth in the reserved regulator corresponding to the first class is proportional to a share of the first input/output class relative to a plurality of input/output classes and a total number of resources of the shared regulator.

19. The storage medium of claim 13, further comprising:
in accordance with a determination that there is not sufficient bandwidth remaining in the reserved regulator corresponding to the first class to dispatch the first task, marking the first input/output class as inactive; and
determining whether a second input/output class is active and has available tasks;
after determining that the second input/output class is active and has available tasks, updating a second deficit value of the second input/output class based on a second deficit quantum value;
after updating the second deficit value based on the second deficit quantum value, determining whether the second deficit value meets a threshold value required to dispatch a second task in a second queue of inputs/outputs corresponding to the second input/output class;
determining whether an outstanding limit on inputs/outputs has been reached;
determining whether an amount of bandwidth remaining in a reserved regulator corresponding to the second class meets a threshold amount of bandwidth required to dispatch the second task; and
in accordance with a determination that the second deficit value meets the threshold value required to dispatch the second task in the second queue of inputs/outputs corresponding to the second input/output class, that the outstanding limit on inputs/outputs has not been reached, and that the amount of bandwidth remaining in the reserved regulator corresponding to the second class meets a threshold amount of bandwidth required to dispatch the second task, dispatching the second task.

20. A distributed computing system for storing data, the system comprising:
one or more processors; and
a memory storing one or more programs configured to be executed by the one or more processors, the one or more programs including instructions for performing operations comprising:
  determining whether a first input/output class is active and has available tasks, wherein the first input/output class corresponds to a type of inputs/outputs received within the distributed computing system;
  after determining that the first input/output class is active and has available tasks, updating a first deficit value of the first input/output class based on a deficit quantum value;
  after updating the first deficit value based on the deficit quantum value, determining whether the first deficit value of the first input/output class meets a threshold to dispatch a first task in a first queue of inputs/outputs corresponding to the first input/output class;
  determining whether an outstanding limit on inputs/outputs has been reached;
  determining whether an amount of bandwidth remaining in a reserved regulator corresponding to the first class meets a threshold amount of bandwidth required to dispatch the first task; and
  in accordance with a determination that the first deficit value meets the threshold value required to dispatch the first task in the first queue of inputs/outputs corresponding to the first input/output class, that the outstanding limit on inputs/outputs has not been reached, and that the amount of bandwidth remaining in the reserved regulator corresponding to the first class meets a threshold amount of bandwidth required to dispatch the first task, dispatching the first task.

* * * * *